US012713307B2

(12) United States Patent
Zhuo et al.

(10) Patent No.: US 12,713,307 B2
(45) Date of Patent: Aug. 18, 2026

(54) INTEGRATED ACCESS AND BACKHAUL NODE CONFIGURATION METHOD AND COMMUNICATION APPARATUS

(71) Applicant: HUAWEI TECHNOLOGIES CO., LTD., Shenzhen (CN)

(72) Inventors: Yibin Zhuo, Shenzhen (CN); Yuanping Zhu, Shanghai (CN); Jing Liu, Shanghai (CN); Yulong Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 517 days.

(21) Appl. No.: 18/165,095

(22) Filed: Feb. 6, 2023

(65) Prior Publication Data

US 2023/0189091 A1 Jun. 15, 2023

Related U.S. Application Data

(63) Continuation of application No. PCT/CN2021/110642, filed on Aug. 4, 2021.

(30) Foreign Application Priority Data

Aug. 7, 2020 (CN) ......................... 202010788512.4

(51) Int. Cl.
*H04W 36/00* (2009.01)
*H04W 36/08* (2009.01)
*H04W 72/0446* (2023.01)

(52) U.S. Cl.
CPC ....... *H04W 36/0072* (2013.01); *H04W 36/08* (2013.01); *H04W 72/0446* (2013.01)

(58) Field of Classification Search
None
See application file for complete search history.

(56) References Cited

U.S. PATENT DOCUMENTS

2020/0337057 A1* 10/2020 Abedini ............... H04B 17/336
2021/0153189 A1* 5/2021 Jo ..................... H04W 72/0453
(Continued)

FOREIGN PATENT DOCUMENTS

CN 110662266 A 1/2020
CN 110753397 A 2/2020
(Continued)

OTHER PUBLICATIONS

Qualcomm New WID on Enhancements to Integrated Accessand Backhaul 3GPP TSG RAN #86 RP-193251 InternetURL:https://www.3gpp.org/ftp/tsg_ran/TSG_RAN/TSGR_86/Docs/RP-193251.zip> Dec. 12, 2019, 7 pages.
(Continued)

*Primary Examiner* — Nicholas Sloms
(74) *Attorney, Agent, or Firm* — HAUPTMAN HAM, LLP

(57) ABSTRACT

An integrated access and backhaul (IAB) node configuration method includes receiving, by a target IAB donor, first information from a source IAB donor. The method also includes sending, by the target IAB donor, first configuration information to the source IAB donor. The first configuration information is for handing over an IAB node from the source IAB donor to the target IAB donor. The IAB node includes a mobile terminal (MT) function and a distributed unit (DU) function. The first configuration information is based on the first information. The first configuration information indicates a transmission direction of a time domain resource configured by the target IAB donor for the MT function. The first information indicates one or more different types of information.

15 Claims, 12 Drawing Sheets

(56) References Cited

U.S. PATENT DOCUMENTS

| | | | | |
|---|---|---|---|---|
| 2021/0160861 | A1* | 5/2021 | You | H04W 56/0015 |
| 2021/0195541 | A1* | 6/2021 | Wei | H04W 72/21 |
| 2021/0227435 | A1* | 7/2021 | Hsieh | H04W 36/087 |
| 2021/0345225 | A1* | 11/2021 | Novlan | H04W 8/24 |
| 2021/0360496 | A1* | 11/2021 | Ishii | H04W 36/362 |
| 2021/0367660 | A1* | 11/2021 | Jo | H04L 5/0092 |
| 2022/0014976 | A1* | 1/2022 | Luo | H04W 36/0044 |
| 2022/0104088 | A1* | 3/2022 | Byun | H04W 36/0235 |
| 2022/0182160 | A1* | 6/2022 | Su | H04B 17/309 |
| 2022/0183003 | A1* | 6/2022 | Wei | H04L 5/0092 |
| 2022/0191832 | A1* | 6/2022 | Yokomakura | H04L 5/0053 |
| 2022/0191863 | A1* | 6/2022 | Miao | H04L 5/0053 |
| 2022/0279511 | A1* | 9/2022 | Kowalski | H04W 72/20 |
| 2023/0300685 | A1* | 9/2023 | Xu | H04W 36/0033 455/436 |

FOREIGN PATENT DOCUMENTS

| | | | |
|---|---|---|---|
| CN | 110831095 | A | 2/2020 |
| CN | 111435876 | A | 7/2020 |
| CN | 111435894 | A | 7/2020 |
| CN | 111436145 | A | 7/2020 |
| EP | 4192103 | A1 | 6/2023 |
| WO | 2020090988 | A1 | 5/2020 |
| WO | 2022028493 | A1 | 2/2022 |

OTHER PUBLICATIONS

Huawei, HiSilicon Duplexing enhancements for R17 IAB,3GPP TSG RAN WG2 #112-e R2-2009653 InternetURL: https://www.3gpp.org/ftp/tsg_ran/WG2_RL2/TSGR2_112-e/Docs/R2-2009653.zip> Oct. 23, 2020, 4 pages.

Japanese Office Action issued in corresponding Japanese Application No. 2023-508521, dated Mar. 5, 2024, pp. 1-4.

Huawei, BL CR to 38.401 Support for IAB. 3GPP TSG RAN WG3 Meeting #106, Reno, NV, USA, Nov. 18-22, 2019, R3-196504, 13 pages.

3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.

3GPP TS 38.401 V16.2.0 (Jul. 2020), 3rd Generation Partnership Project; Technical Specification Group Radio Access Network; NG-RAN; Architecture description(Release 16), 77 pages.

3GPP TS 38.213 V16.2.0 (Jun. 2020), 3rd Generation Partnership Project; Technical Specification Group Radio Access Network; NR; Physical layer procedures for control(Release 16), 176 pages.

ATandT, TP for 38.874 on PHY Enhancements for NR IAB. 3GPP TSG RAN WG1 Meeting #95, Spokane, USA, Nov. 12-16, 2018, R1-1814190, 21 pages.

KDDI Corporation, Considerations on reducing signal overhead during Inter-donor IAB node migration. 3GPP TSG-RAN3 WG Meeting #109-e, Online, Aug. 17-Aug. 28, 2020, R3-204660, 3 pages.

Extended European Search Report issued in corresponding European Application No. 21853130.9, dated Dec. 15, 2023, pp. 1-12.

Australian Office Action issued in corresponding Australian Application No. 2021319651, dated Apr. 8, 2024, pp. 1-3.

* cited by examiner

IAB node

DU

MT

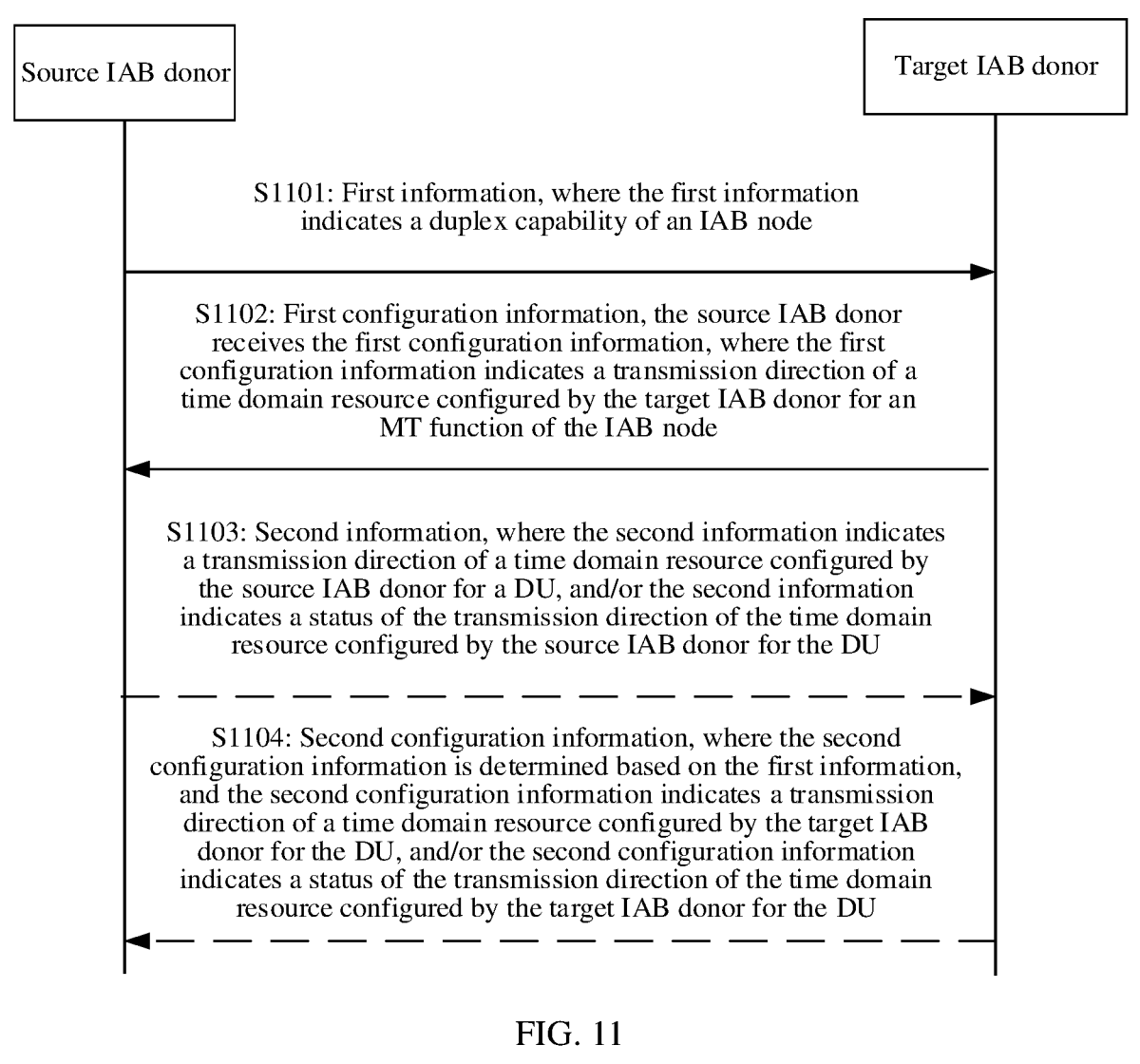

Source IAB donor

Target IAB donor

S1101: First information, where the first information indicates a duplex capability of an IAB node S1102: First configuration information, the source IAB donor receives the first configuration information, where the first configuration information indicates a transmission direction of a time domain resource configured by the target IAB donor for an MT function of the IAB node S1103: Second information, where the second information indicates a transmission direction of a time domain resource configured by the source IAB donor for a DU, and/or the second information indicates a status of the transmission direction of the time domain resource configured by the source IAB donor for the DU S1104: Second configuration information, where the second configuration information is determined based on the first information, and the second configuration information indicates a transmission direction of a time domain resource configured by the target IAB donor for the DU, and/or the second configuration information indicates a status of the transmission direction of the time domain resource configured by the target IAB donor for the DU

FIG. 11

INTEGRATED ACCESS AND BACKHAUL NODE CONFIGURATION METHOD AND COMMUNICATION APPARATUS

CROSS-REFERENCE TO RELATED APPLICATIONS

This application is a continuation of International Application No. PCT/CN2021/110642, filed on Aug. 4, 2021, which claims priority to Chinese Patent Application No. 202010788512.4, filed on Aug. 7, 2020. The disclosures of the aforementioned applications are hereby incorporated by reference in their entireties.

TECHNICAL FIELD

This application relates to the field of communications technologies, and in particular, to an IAB node configuration method and a communication apparatus.

BACKGROUND

To improve a capacity and coverage of a network, a relay node supporting wireless backhaul transmission is proposed to implement a dense network deployment. A node supporting a relay function is referred to as a relay node for short. The relay node provides functions and services similar to those of an ordinary base station to a terminal accessing a cell of the relay node. A communication link between the relay node and the terminal is referred to as an access link. The relay node accesses, in a manner similar to a terminal, a base station serving the relay node through a radio interface. The base station is referred to as another relay node or a donor base station. Radio interface links between the relay nodes and between the relay node and the donor base station are referred to as backhaul links.

Future communications technologies support higher bandwidth and larger-scale multi-antenna or multi-beam transmission, and provide a condition for a relay in which the access link and the backhaul link share an air interface resource, that is, provide a condition for a relay in which a wireless access link and a wireless backhaul link are integrated. The relay in which the wireless access link and the wireless backhaul link are integrated may be referred to as an integrated access and backhaul (IAB) node. It should be understood that the IAB node establishes a wireless backhaul link with one or more upper-level nodes, and accesses a core network through the upper-level nodes. The IAB node may also provide an access service for a plurality of lower-level nodes and the terminal.

A poor link status or congestion of the backhaul link or the access link may cause a communication interruption of a link between the IAB node and an upper-level node, which may involve cross-donor base station handover. How to perform resource allocation of the cross-donor base station handover of the IAB node is a problem that needs to be resolved.

SUMMARY

This application provides an IAB node configuration method and a communication apparatus, which may avoid a conflict between an MT configuration and a DU configuration of an IAB node in a cross-donor handover process of the IAB node.

According to a first aspect, an IAB node configuration method is provided and performed by a first communication apparatus. The first communication apparatus may be a communication device or a communication apparatus that can support a communication device in performing a function required by the method, for example, a chip system. The following is described by using an example in which the communication device is a target IAB donor. The method includes:

A target IAB donor receives first information from a source IAB donor, and the target IAB donor sends first configuration information to the source IAB donor. The first configuration information is for handing over an IAB node from the source IAB donor to the target IAB donor. The IAB node includes an MT function and a DU function, the first configuration information is determined based on the first information, the first configuration information indicates a transmission direction of a time domain resource configured by the target IAB donor for the MT function, and the first information indicates one or more of the following four types of information:

supporting or not supporting that the MT function receives data and the DU function sends data simultaneously;

supporting or not supporting that the MT function receives data and the DU function receives data simultaneously;

supporting or not supporting that the MT function sends data and the DU function sends data simultaneously; and supporting or not supporting that the MT function sends data and the DU function receives data simultaneously.

In embodiments of this application, the first information may indicate the foregoing four types of information, and the foregoing four types information may be considered as a duplex capability or duplex information or a multiplexing capability or multiplexing information of the IAB node. The target IAB donor determines the first configuration information based on the first information, that is, the target IAB donor configures a transmission direction of a time domain resource of the MT function for the IAB node based on the duplex capability of the IAB node. For example, the first information indicates not supporting that the MT function receives data and the DU function receives data simultaneously. In this case, in a time domain resource, if a transmission direction of a time domain resource of the DU function is an uplink transmission direction (uplink transmission of the DU function indicates that the DU function receives data), the first configuration information cannot configure a transmission direction of a time domain resource for the MT function as a downlink transmission direction (downlink transmission of the MT function indicates that the MT function receives data) in the time domain resource. It can be learned that according to the method provided in embodiments of this application, because the first information is a premise of the transmission direction of the time domain resource configured for the MT function, during implementing the cross-donor handover process of the IAB node, a receiving and sending conflict between the DU function and the MT function of the IAB node can be avoided, and further, a communication exception on a link between the IAB node and a lower-level node of the IAB node or a link between the IAB node and an upper-level node of the IAB node can be avoided.

In a possible implementation, the method further includes: The target IAB donor receives second information from the source IAB donor. The second information indicates a transmission direction of a time domain resource configured by the source IAB donor for the DU function, and/or the second information indicates a status of the transmission direction of the time domain resource configured by the source IAB donor for the DU function. In this solution, the source IAB donor may provide the target IAB donor with the transmission direction of the time domain resource configured by the source IAB donor for the DU function and/or the status of the transmission direction. In this way, the target IAB donor may determine, with reference to what the source IAB donor configures for the DU function, how to configure the MT function, to avoid a conflict between the configuration of the MT function and the configuration of the DU function.

In a possible implementation, the method further includes: The target IAB donor sends second configuration information to the source IAB donor. The second configuration information is determined based on the first information, the second configuration information indicates a transmission direction of a time domain resource configured by the target IAB donor for the DU function, and/or the second configuration information indicates a status of the transmission direction of the time domain resource configured by the target IAB donor for the DU function. In this solution, considering that before cross-donor handover, the configuration of the DU function is configured by the source IAB donor, and after the cross-donor handover, the configuration of the MT function is configured by the target IAB donor, in this case, the configuration configured by the source IAB donor for the DU function may not be preferred. Therefore, the target IAB donor may further update the configuration of the DU function, to improve configuration utilization of the DU function as much as possible.

In a possible implementation, the first information and/or the second information is carried in a first request message, first interface signaling bears the first request message, a first interface is an interface between the target IAB donor and the source IAB donor, and the first request message is for requesting to hand over the IAB node from the source IAB donor to the target IAB donor; or the first information and/or the second information is received by the target IAB donor through a core network device. This solution enumerates two implementations of the first information and the second information, that is, the first information or the second information may be sent through the interface between the target IAB donor and the source IAB donor, or may be forwarded through the core network device that can communicate with both the source IAB donor and the target IAB donor, which is flexible. For example, the first information and/or the second information may be carried in a request message for handing over the IAB node from the source IAB donor to the target IAB donor, to be better compatible with an existing protocol architecture. In addition, the first information and the second information may be sent together through one piece of signaling, that is, two types of information may be sent through one piece of signaling, which can reduce signaling overheads; or the first information and the second information may be separately sent, and a sending manner of the first information and the second information is not limited, which is flexible.

In a possible implementation, the first configuration information and/or the second configuration information is carried in a first request response message, the first interface signaling bears the first request response message, the first interface is the interface between the target IAB donor and the source IAB donor, and the first request response message is a response message sent by the target IAB donor to the source IAB donor in response to a request message for handing over the IAB node from the source IAB donor to the target IAB donor; or the first configuration information and/or the second configuration information is forwarded by the target IAB donor to the source IAB donor through the core network device. This solution enumerates two implementations of the first configuration information and the second configuration information, that is, the first configuration information or the second configuration information may be sent through the interface between the target IAB donor and the source IAB donor, or may be forwarded through the core network device that can communicate with both the target IAB donor and the source IAB donor, which is flexible. For example, the first configuration information and/or the second configuration information may be carried in a response message in response to a request message for handing over the IAB node from the source IAB donor to the target IAB donor, to be better compatible with an existing protocol architecture. In addition, the first configuration information and the second configuration information may be sent together through one piece of signaling, that is, two types of information may be sent through one piece of signaling, which can reduce signaling overheads; or the first configuration information and the second configuration information may be separately sent, and a sending manner of the first information and the second information is not limited, which is flexible.

In a possible implementation, the transmission direction of the time domain resource is an uplink transmission direction, a downlink transmission direction, or a flexible transmission direction; and the status of the transmission direction of the time domain resource is an available state, a conditionally available state, or a not available state. This solution enumerates three possible transmission directions of the time domain resource and three states of each transmission direction.

According to a second aspect, another IAB node configuration method is provided and performed by a second communication apparatus. The second communication apparatus may be a communication device or a communication apparatus that can support a communication device in performing a function required by the method, for example, a chip system. The following is described by using an example in which the communication device is a source IAB donor. The method includes:

The source IAB donor sends first information to a target IAB donor, and the source IAB donor receives first configuration information from the target IAB donor. The first configuration information is for handing over an IAB node from the source IAB node to the target IAB donor. The IAB node includes an MT function and a DU function, the first configuration information is determined based on the first information, the first configuration information indicates a transmission direction of a time domain resource configured by the target IAB donor for the MT function, and the first information indicates one or more of four types of information:

- supporting or not supporting that the MT function receives data and the DU function sends data simultaneously;
- supporting or not supporting that the MT function receives data and the DU function receives data simultaneously;
- supporting or not supporting that the MT function sends data and the DU function sends data simultaneously; and
- supporting or not supporting that the MT function sends data and the DU function receives data simultaneously.

In a possible implementation, the method further includes: The source IAB donor sends second information to the target IAB donor. The second information indicates a transmission direction of a time domain resource configured by the source IAB donor for the DU function, and/or the second information indicates a status of the transmission direction of the time domain resource configured by the source IAB donor for the DU function.

In a possible implementation, the method further includes: The source IAB donor receives second configuration information from the target IAB donor. The second configuration information is determined based on the first information, the second configuration information indicates a transmission direction of a time domain resource configured by the target IAB donor for the DU function, and/or the second configuration information indicates a status of the transmission direction of the time domain resource configured by the target IAB donor for the DU function.

In a possible implementation, the first information and/or the second information is carried in a first request message, first interface signaling bears the first request message, a first interface is an interface between the target IAB donor and the source IAB donor, and the first request message is for requesting to hand over the IAB node from the source IAB donor to the target IAB donor; or the first information and/or the second information is sent by the source IAB donor through a core network device.

In a possible implementation, the first configuration information and/or the second configuration information is carried in a first request response message, the first interface signaling bears the first request response message, the first interface is the interface between the target IAB donor and the source IAB donor, and the first request response message is a response message sent by the target IAB donor to the source IAB donor in response to a request message for handing over the IAB node from the source IAB donor to the target IAB donor; or the first configuration information and/or the second configuration information is received by the source IAB donor through the core network device.

In a possible implementation, the transmission direction of the time domain resource is an uplink transmission direction, a downlink transmission direction, or a flexible transmission direction; and the status of the transmission direction of the time domain resource is an available state, a conditionally available state, or a not available state.

For technical effects brought by the second aspect or the possible implementations of the second aspect, refer to the descriptions of the technical effects of the first aspect or the possible implementations of the first aspect.

According to a third aspect, an embodiment of this application provides a communication apparatus. The communication apparatus has a function of implementing behaviors of the method embodiment in the first aspect. The function may be implemented by hardware, or may be implemented by hardware executing corresponding software. The hardware or the software includes one or more modules corresponding to the foregoing function. In a possible implementation, the communication apparatus includes a transceiver module and a processing module.

The transceiver module is configured to receive first information from a source IAB donor, and send first configuration information to the source IAB donor; and the processing module is configured to generate the first configuration information. The first configuration information is for handing over an IAB node from the source IAB donor to the communication apparatus.

The IAB node includes an MT function and a DU function, the first configuration information is determined based on the first information, the first configuration information indicates a transmission direction of a time domain resource configured by the communication apparatus for the MT function, and the first information indicates one or more of the following four types of information:

- supporting or not supporting that the MT function receives data and the DU function sends data simultaneously;
- supporting or not supporting that the MT function receives data and the DU function receives data simultaneously;
- supporting or not supporting that the MT function sends data and the DU function sends data simultaneously; and
- supporting or not supporting that the MT function sends data and the DU function receives data simultaneously.

In a possible implementation, the transceiver module is further configured to: receive second information from the source IAB donor. The second information indicates a transmission direction of a time domain resource configured by the source IAB donor for the DU function, and/or the second information indicates a status of the transmission direction of the time domain resource configured by the source IAB donor for the DU function.

In a possible implementation, the transceiver module is further configured to send second configuration information to the source IAB donor. The second configuration information is determined based on the first information, and the second configuration information indicates a transmission direction of a time domain resource configured by the communication apparatus for the DU function, and/or the second configuration information indicates a status of the transmission direction of the time domain resource configured by the communication apparatus for the DU function.

In a possible implementation, the first information and/or the second information is carried in a first request message, first interface signaling bears the first request message, a first interface is an interface between the communication apparatus and the source IAB donor, and the first request message is for requesting to hand over the IAB node from the source IAB donor to the communication apparatus; or the first information and/or the second information is received by the communication apparatus through a core network device.

In a possible implementation, the first configuration information and/or the second configuration information is carried in a first request response message, the first interface signaling bears the first request response message, the first interface is the interface between the communication apparatus and the source IAB donor, and the first request response message is a response message sent by the communication apparatus to the source IAB donor in response to a request message for handing over the IAB node from the source IAB donor to the communication apparatus; or the first configuration information and/or the second configuration information is forwarded by the communication apparatus to the source IAB node through the core network device.

In a possible implementation, the transmission direction of the time domain resource is an uplink transmission direction, a downlink transmission direction, or a flexible transmission direction; and the status of the transmission direction of the time domain resource is an available state, a conditionally available state, or a not available state.

For technical effects brought by the third aspect or the possible implementations of the third aspect, refer to the descriptions of the technical effects of the first aspect or the possible implementations of the first aspect.

According to a fourth aspect, an embodiment of this application provides a communication apparatus. The communication apparatus has a function of implementing behaviors of the method embodiment in the second aspect. The function may be implemented by hardware, or may be implemented by hardware executing corresponding software. The hardware or the software includes one or more modules corresponding to the foregoing function. In a possible implementation, the communication apparatus includes a transceiver module and a processing module.

- the processing module is configured to generate first information; and
- the transceiver module is configured to send the first information to a target IAB donor, and receive first configuration information from the target IAB donor. The first configuration information is for handing over an IAB node from the communication apparatus to the target IAB donor.

The IAB node includes an MT function and a DU function, the first configuration information is determined based on the first information, the first configuration information indicates a transmission direction of a time domain resource configured by the target IAB donor for the MT function, and the first information indicates one or more of four types of information:

- supporting or not supporting that the MT function receives data and the DU function sends data simultaneously;
- supporting or not supporting that the MT function receives data and the DU function receives data simultaneously;
- supporting or not supporting that the MT function sends data and the DU function sends data simultaneously; and
- supporting or not supporting that the MT function sends data and the DU function receives data simultaneously.

In a possible implementation, the transceiver module is further configured to send second information to the target IAB donor. The second information indicates a transmission direction of a time domain resource configured by the communication apparatus for the DU function, and/or the second information indicates a status of the transmission direction of the time domain resource configured by the communication apparatus for the DU function.

In a possible implementation, the transceiver module is further configured to receive second configuration information from the target IAB donor. The second configuration information is determined based on the first information, the second configuration information indicates a transmission direction of a time domain resource configured by the target IAB donor for the DU function, and/or the second configuration information indicates a status of the transmission direction of the time domain resource configured by the target IAB donor for the DU function.

In a possible implementation, the first information and/or the second information is carried in a first request message, first interface signaling bears the first request message, a first interface is an interface between the target IAB donor and the communication apparatus, and the first request message is for requesting to hand over the IAB node from the communication apparatus to the target IAB donor; or the first information and/or the second information is sent by the communication apparatus through a core network device.

In a possible implementation, the first configuration information and/or the second configuration information is carried in a first request response message, the first interface signaling bears the first request response message, the first interface is the interface between the target IAB donor and the communication apparatus, and the first request response message is a response message sent by the target IAB donor to the communication apparatus in response to a request message for handing over the IAB node from the communication apparatus to the target IAB donor; or the first configuration information and/or the second configuration information is received by the communication apparatus through the core network device.

In a possible implementation, the transmission direction of the time domain resource is an uplink transmission direction, a downlink transmission direction, or a flexible transmission direction; and the status of the transmission direction of the time domain resource is an available state, a conditionally available state, or a not available state.

For technical effects brought by the fourth aspect or the possible implementations of the fourth aspect, refer to the descriptions of the technical effects brought by the second aspect or the possible implementations of the second aspect.

According to a fifth aspect, an embodiment of this application provides a communication apparatus. The communication apparatus may be the communication apparatus in the third aspect or the fourth aspect in the foregoing embodiments, or a chip disposed in the communication apparatus in the third aspect or the fourth aspect. The communication apparatus includes a communication interface and a processor, and optionally, further includes a memory. The memory is configured to store a computer program, an instruction, or data. The processor is coupled to the memory and the communication interface. When the processor fetches the computer program, the instruction, or the data, the communication apparatus is enabled to perform the method performed by the target IAB donor or the source IAB donor in the method embodiment in the first aspect or the second aspect.

It should be understood that the communication interface may be a transceiver in the communication apparatus, and is implemented, for example, through an antenna, a feeder, and a codec in the communication apparatus, or if the communication apparatus is a chip disposed in a network device, the communication interface may be an input/output interface of the chip, for example, an input/output pin or the like. The transceiver is configured for the communication apparatus to communicate with another device. For example, when the communication apparatus is a target IAB donor, the another device is a source IAB donor; or when the communication apparatus is a source IAB donor, the another device is a target IAB donor.

According to a sixth aspect, an embodiment of this application provides a chip system. The chip system includes a processor, and may further include a memory, configured to implement the method performed by the communication apparatus in the third aspect or the fourth aspect. In a possible implementation, the chip system further includes a memory configured to store program instructions and/or data. The chip system may include a chip, or include a chip and another discrete device.

According to a seventh aspect, an embodiment of this application provides a communication system. The communication system includes the communication apparatus according to the third aspect and the communication apparatus according to the fourth aspect.

According to an eighth aspect, this application provides a computer-readable storage medium. The computer-readable storage medium stores a computer program. When the computer program is executed, the method performed by the target IAB donor in the foregoing aspects is implemented; or the method performed by the source IAB donor in the foregoing aspects is implemented.

According to a ninth aspect, a computer program product is provided, including computer program code. The computer program code, when executed, causes the method performed by the target IAB donor in the foregoing aspects to be performed, or causes the method performed by the source IAB donor in the foregoing aspects to be performed.

For beneficial effects of the fifth aspect to the ninth aspect and the implementations thereof, refer to the descriptions of beneficial effects of the method according to the first aspect or the second aspect and the implementations thereof.

In the method provided in embodiments of this application, in the cross-donor handover process of the IAB node, the target IAB donor configures the transmission direction of the time domain resource for the MT function with a duplex capability of the MT function and the DU function of the IAB node as a premise. In this way, a conflict between the transmission direction of the time domain resource of the MT function of the IAB node and the transmission direction of the time domain resource of the DU function of the IAB node can be avoided, so that a communication exception of the IAB node can be avoided as much as possible.

BRIEF DESCRIPTION OF DRAWINGS

FIG. 11 is a schematic flowchart of an IAB node configuration method according to an embodiment of this application;

DESCRIPTION OF EMBODIMENTS

Figures 1, 2:
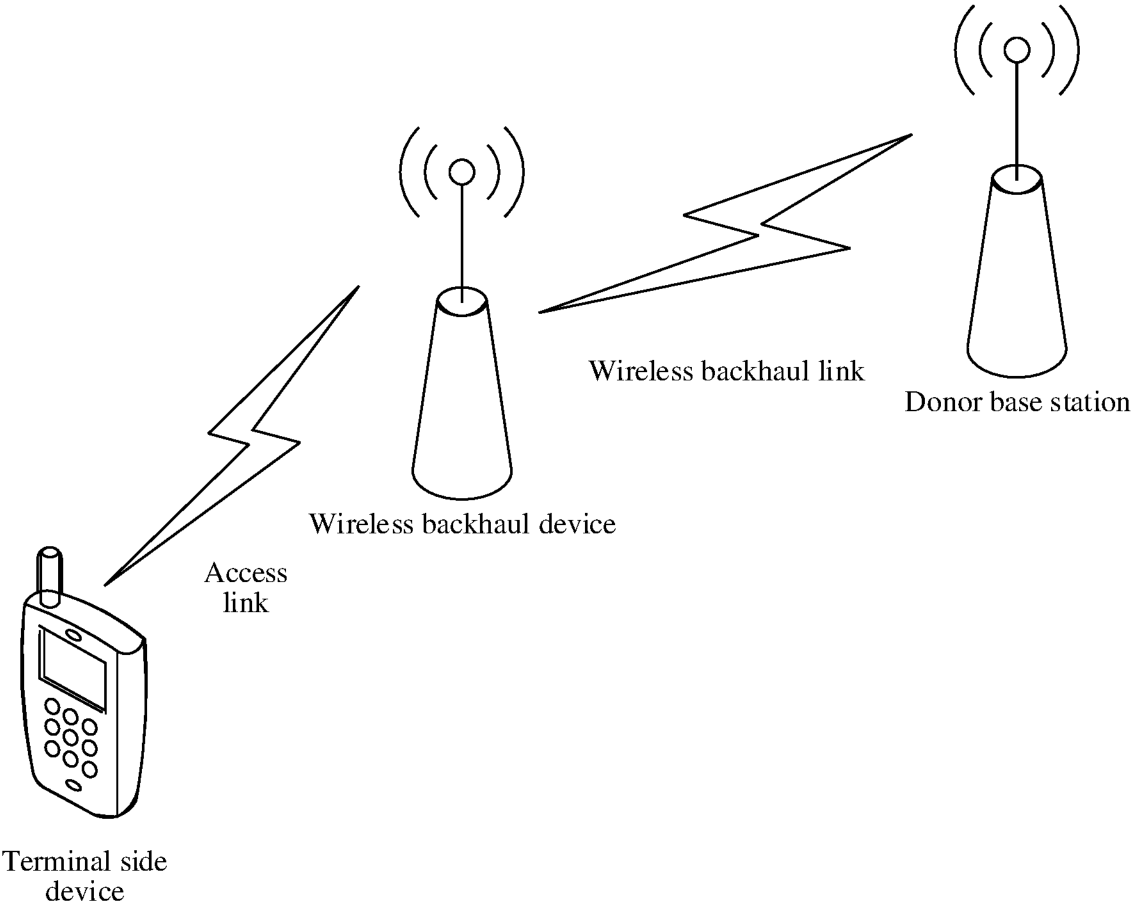
FIG. 1 is a diagram of an architecture of a communication system according to an embodiment of this application.
FIG. 2 is a schematic diagram of a structure of an IAB node according to an embodiment of this application.

To make objectives, technical solutions, and advantages of embodiments of this application clearer, the following further describes embodiments of this application in detail with reference to the accompanying drawings.

Before this application is described, some terms in embodiments of this application are first briefly explained and described, to help a person skilled in the art have a better understanding.

1) A terminal side device is a device that provides voice and/or data connectivity for a user. The terminal side device involved in this application may be a terminal device, a terminal, or a hardware component that can implement a function of the terminal device inside the terminal device.

In embodiments of this application, the terminal side device may be referred to as user equipment (UE), a mobile station (MS), a mobile terminal (MT), or the like. For example, the terminal side device may include hand-held equipment with a wireless connection function, or a processing device connected to a wireless modem. The terminal may communicate with a core network through a radio access network (RAN), and exchange a voice and/or data with the RAN. Examples of some terminal devices are: devices such as a personal communication service (PCS) phone, a cordless telephone set, a session initiation protocol (SIP) phone, a wireless local loop (WLL) station, a personal digital assistant (PDA), a bar code, a radio frequency identification (RFID), a sensor, and a satellite navigation system, for example, an information sensing device such as a global positioning system (GPS), a BeiDou positioning system, or a laser scanner.

The terminal side device may further be wearable equipment. The wearable equipment may also be referred to as a wearable intelligent device, and is a general term for wearable devices, such as glasses, gloves, watches, clothes, and shoes, that are developed by applying a wearable technology to performing an intelligent design on a daily dress. The wearable equipment is a portable device that is directly worn on a body or integrated into clothes or an accessory of a user. The wearable equipment is not merely a hardware device, but is used to implement a powerful function through software support, data interaction, and cloud interaction. In a board sense, the wearable intelligent device includes full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs. Alternatively, the terminal may be a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home, a terminal device in a future evolved public land mobile network (PLMN), a vehicle device in vehicle to everything (V2X), customer premises equipment (CPE), or the like.

A function of the terminal side device may be implemented by a hardware component inside the terminal device. The hardware component may be a processor and/or a programmable chip inside the terminal device. Optionally, the chip may be implemented by using an application-specific integrated circuit (ASIC) or a programmable logic device (PLD). The foregoing PLD may be any one of a complex programmable logic device (CPLD), a field-programmable gate array (FPGA), a generic array logic (GAL), and a system on a chip (SOC), or any combination thereof.

However, if the various terminals described above are located on a vehicle (for example, placed in the vehicle or installed in the vehicle), the terminals may be considered as in-vehicle terminal devices. An in-vehicle terminal device, for example, is also referred to as an on-board unit (OBU).

2) A donor base station, also referred to as a donor node, is a node through which a core network can be accessed, and is a device that connects a terminal side device to a wireless network in a communication system. The donor base station is generally connected to the core network by using a wired link (for example, a fiber-optical cable). The donor base station may be responsible for receiving data from the core network and forwarding the data to a wireless backhaul device, or receiving data from the wireless backhaul device and forwarding the data to the core network. Generally, the donor base station may be connected to a network in a wired manner.

As an example, the donor base station may include a radio network controller (RNC), a Node B (NB), a base station controller (BSC), a base transceiver station (BTS), a home base station (for example, a home evolved NodeB, or a home Node B, HNB), a baseband unit (BBU), and the like, or may include an evolved NodeB (NodeB or eNB or e-NodeB) in an evolved LTE system (LTE-A), or may include a next generation Node B (next generation node B, gNB) in a fifth generation mobile communication technology (5G) new radio (NR) system, or the like. As another example, the donor base station may include a central unit (CU) (referred to as Donor-CU or gNB-CU for short in this application) and a distributed unit (DU) (referred to as Donor-DU or gNB-DU for short in this application). The gNB-CU and the gNB-DU are connected through an F1 interface, and the F1 interface may further include a control plane interface (F1-C) and a user plane interface (F1-U). The CU and the core network are connected through a next generation (NG) interface. The gNB-CU or the Donor-CU may alternatively exist in a form in which a user plane (UP) (referred to as CU-UP in this application) and a control plane (CP) (referred to as CU-CP in this application) are separated. In other words, the gNB-CU or the Donor-CU includes the CU-CP and the CU-UP. One gNB-CU may include one gNB-CU-CP and at least one gNB-CU-UP. Alternatively, one Donor-CU may include one Donor-CU-CP and at least one Donor-CU-UP.

A function of the donor base station may be implemented by a hardware component inside the donor base station, for example, a processor and/or a programmable chip inside the donor base station. For example, the chip may be implemented by using an ASIC or a PLD. The PLD may be any one of a CPLD, an FPGA, a GAL, or a SOC, or any combination thereof.

3) In embodiments of this application, "a plurality of" means two or more. In view of this, in embodiments of this application, "a plurality of" may also be understood as "at least two". "At least one" may be understood as one or more, for example, one, two, or more. For example, "including at least one" means that one, two, or more are included, and there is no limitation on which items are included. For example, if at least one of A, B, or C is included, the included items may be A alone, B alone, C alone, both A and B, both A and C, both B and C, or all of A, B, and C. "And/or" describes an association relationship of associated objects and represents that three relationships may exist. For example, A and/or B may represent the following three cases: Only A exists, both A and B exist, and only B exists. In addition, if there is no special description, the character "/" generally indicates an "or" relationship between the associated objects. The terms "system" and "network" may be used interchangeably in embodiments of this application.

Unless otherwise stated, ordinal terms such as "first" and "second" mentioned in embodiments of this application are intended to distinguish a plurality of objects, and are not intended to limit an order, a time sequence, priorities, or importance degrees of the plurality of objects.

The following describes technical features related to embodiments of this application.

To improve spectrum utilization, base stations will be deployed more densely in the future. However, because deployment costs of an optical fiber are very high, some deployment costs of the optical fiber may be reduced by establishing a connection between a backhaul link of a wireless backhaul device and a core network. The wireless backhaul device may provide a wireless access service for the terminal side device through an access link (AL). The wireless backhaul device is connected to the donor base station through a backhaul link (BL) to transmit service data of the terminal side device. A coverage range of a mobile communication system is expanded by resending or forwarding the service data. As an example, in Long Term Evolution (LTE), the wireless backhaul device may be referred to as a relay node (RN), or may be referred to as a relay device, a relay transmission reception point (rTRP), a transmission point (TP), or the like.

The wireless backhaul device may establish a wireless backhaul link with one or more upper-level nodes, and access the core network through the upper-level nodes. The upper-level nodes may control the wireless backhaul device to a certain extent (for example, data scheduling, timing modulation, power control, or the like) by using various signaling. In addition, the wireless backhaul device may provide a service for one or more lower-level nodes. The upper-level node of the wireless backhaul device may be a base station or another relay node. The lower-level node of the wireless backhaul device may be a terminal, or may be another relay node.

To improve the spectrum utilization, a link between the wireless backhaul device and the upper-level node may share a same frequency band with a link between the wireless backhaul device and the lower-level node. This solution is also referred to as an in-band relay. The in-band relay generally has a half-duplex constraint. That is, when receiving a downlink signal sent by an upper-level node of the wireless backhaul device, the wireless backhaul device cannot send a downlink signal to a lower-level node of the wireless backhaul device, and when receiving an uplink signal sent by a lower-level node of the wireless backhaul device, the wireless backhaul device cannot send an uplink signal to an upper-level node of the wireless backhaul device.

A relay solution of a new generation wireless communication system (NR) is referred to as an IAB, and correspondingly, the wireless backhaul device is referred to as an IAB node. When the IAB node operates normally, resource multiplexing may be performed on a link between the IAB node and an upper-level node and a link between the IAB node and a lower-level node in a time division, space division, or frequency division manner.

FIG. 1 shows an IAB system, in which an IAB node provides a terminal with wireless access and wireless backhaul of an access service. An IAB donor node provides a wireless backhaul function for the IAB node and provides an interface between the terminal and a core network. The IAB node is connected to the IAB donor node through a wireless backhaul link, so that a terminal side device served by the IAB node is connected to the core network.

It should be noted that, in a diagram of a network architecture shown in FIG. 1, although the terminal side device, a wireless backhaul device, and a donor base station are shown, the network architecture may not be limited to including the terminal side device, the wireless backhaul device, and the donor base station. For example, a core network device, a device for bearing a virtual network function, or the like, may be further included. These are obvious to a person of ordinary skill in the art, and are not described one by one in detail herein. In addition, in the system shown in FIG. 1, although one terminal side device, one wireless backhaul device, and one donor base station are shown, the network architecture does not limit quantities of the terminal side device, the wireless backhaul device, and the donor base station. For example, alternatively, a plurality of terminal side devices, wireless backhaul devices, and donor base stations may be included. In the following descriptions, an example in which the wireless backhaul device is an IAB node is used.

Figure 3:
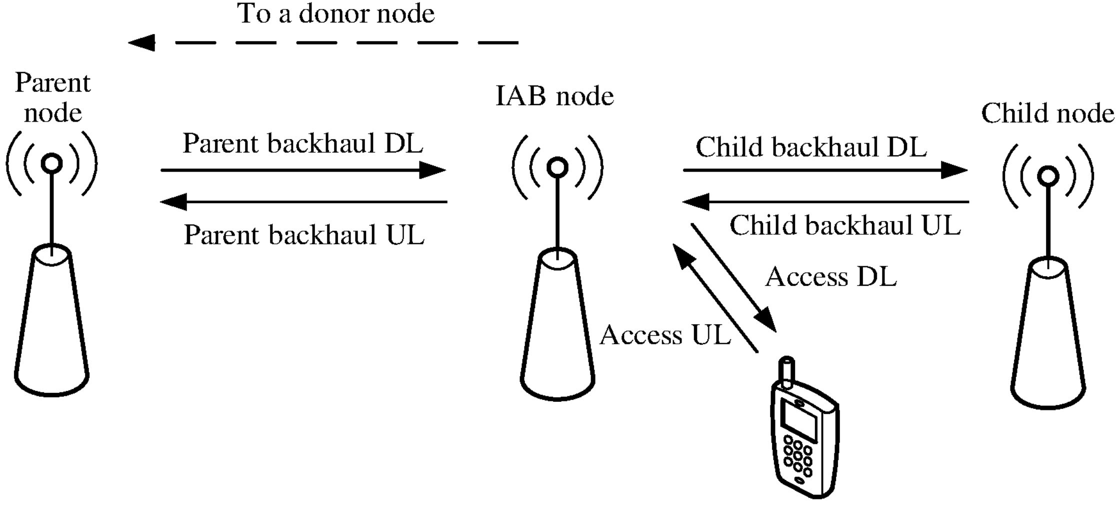
FIG. 3 is a schematic diagram of a backhaul link and an access link according to an embodiment of this application.

FIG. 2 is a schematic diagram of a structure of an IAB node. An IAB node in the NR may include two parts: a mobile terminal (MT) and a distributed unit (DU). The MT may also be understood as a component similar to a terminal in the IAB node. The DU is relative to a centralized unit (CU) function of a network device. Therefore, it may also be considered that the IAB node includes an MT function and a DU function. For ease of description, in the following, the MT function is referred to as an MT, and the DU function is referred to as a DU. Because the MT is similar to a function of an ordinary terminal, it may be understood that the MT is used by the IAB node to communicate with an upper-level node (parent node). The DU is used by the IAB node to communicate with a lower-level node (child node). It should be understood that the parent node may be a base station or another IAB node, and the child node may be a terminal or another IAB node. A link on which the MT communicates with the parent node is referred to as a parent backhaul link, a link on which the DU communicates with the lower-level IAB node is referred to as a child backhaul link, and a link on which the DU communicates with a subordinate terminal is referred to as an access link. The IAB node may be connected to a donor node through a plurality of parent nodes. In some embodiments, the child backhaul link is also referred to as the access link. As shown in FIG. 3, the parent backhaul link includes parent backhaul uplink (UL) and parent backhaul downlink (DL), the child backhaul link includes child backhaul UL and child backhaul DL, and the access link includes access UL and access DL.

An IAB node configuration method provided in embodiments of this application may be applied to various communication systems including wireless backhaul devices, for example, an NR system, an LTE system, an LTE-A system, worldwide interoperability for microwave access (WiMAX), a wireless local area network (WLAN), or the like.

For example, a communication method provided in embodiments of this application may be applied to the network architecture shown in FIG. 1. In the network architecture shown in FIG. 1, a terminal side device is connected to a wireless backhaul device in a wireless manner, and the wireless backhaul device is connected to a donor base station in a wireless manner. Both communication between the terminal side device and the wireless backhaul device and communication between the wireless backhaul device and the donor base station may be performed through a licensed spectrum, or may be performed through an unlicensed spectrum, or may be performed through both a licensed spectrum and an unlicensed spectrum. For example, the licensed spectrum may be a spectrum below 6 GHz, which is not limited herein. It should be understood that FIG. 1 is only an example for description, and does not specifically limit a quantity of the terminal side device and the wireless backhaul device included in a wireless communication system. In the network architecture shown in FIG. 1, the wireless backhaul device considers a node that provides a backhaul service for the wireless backhaul device as a unique parent node. For example, the wireless backhaul device considers a donor base station as a parent node. After receiving a radio bearer that bears uplink information from the terminal side device, the wireless backhaul device transmits the radio bearer to the donor base station, and then the donor base station sends the uplink information in the radio bearer to a mobile gateway device (for example, a user plane function (UPF) entity in a 5G network). A radio bearer bearing downlink information is sent by the mobile gateway device to the donor base station, and then sequentially, to the wireless backhaul device and the terminal side device.

It should be understood that using the IAB node in embodiments of this application is merely for the need of description, and does not mean that the solutions in embodiments of this application are used only in an NR scenario. In embodiments of this application, the IAB node may be generally any node or device having a wireless backhaul function. It should be understood that use of the IAB node and use of the relay node in embodiments of this application have a same meaning.

Figure 4:
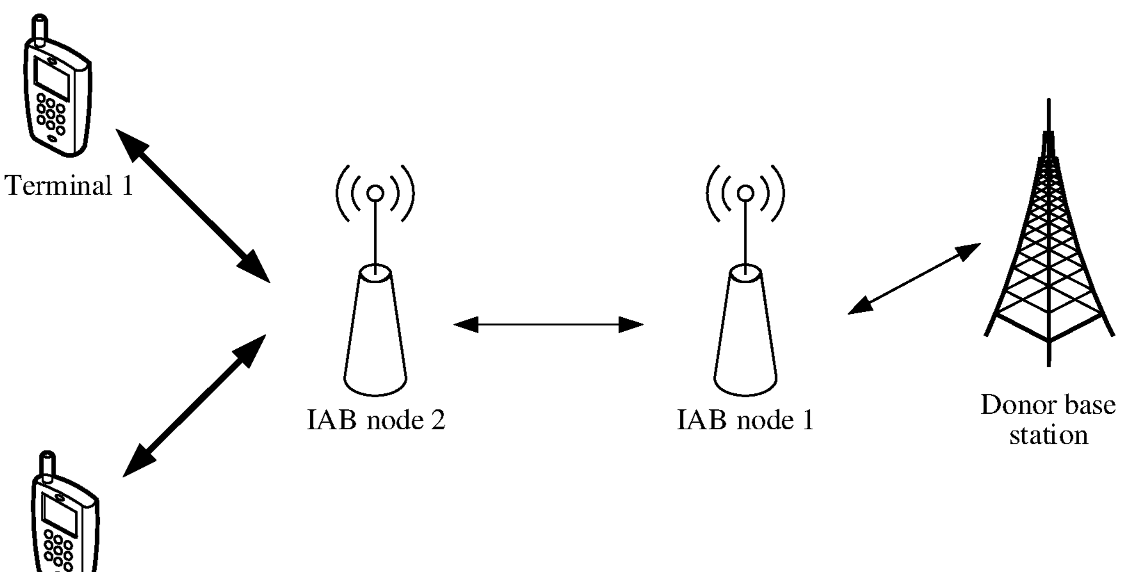
FIG. 4 is a schematic diagram of an architecture of an exemplary communication system to which an embodiment of this application is applicable.

As an example, refer to FIG. 4, which is an example of a communication system including a plurality of terminals and a plurality of IAB nodes. FIG. 4 uses an example in which two terminals and two IAB nodes are included. The two terminals area terminal 1 and a terminal 2, and the two IAB nodes are an IAB node 1 and an IAB node 2. The terminal 1 and the terminal 2 may access the IAB node 2, the IAB node 2 is connected to the IAB node 1 in a wireless manner, and the IAB node 1 is connected to the donor base station in a wireless manner. It should be understood that the IAB node 1 is a parent node of the IAB node 2, and the donor base station is a parent node of the IAB node 1. The IAB node 2 provides a wireless access service for the terminal 1 and the terminal 2 through an access link (shown by using a thick line in FIG. 4). Radio bearers sent by the terminal 1 and the terminal 2 are transmitted to the donor base station through the IAB node 2 and the IAB node 1 in sequence, and then the donor base station sends uplink information in the radio bearers to the mobile gateway device. Conversely, the mobile gateway device may send a radio bearer configured to bear downlink information to the donor base station, and then, via the IAB node 1 and IAB node 2 in sequence, to the terminal 1 and terminal 2. It can be learned from FIG. 4 that a radio bearer sent by any terminal is transmitted to the donor base station via two IAB nodes in sequence, which may be understood as a multi-hop wireless backhaul scenario, and a coverage range of a network may be ensured.

Figure 5:
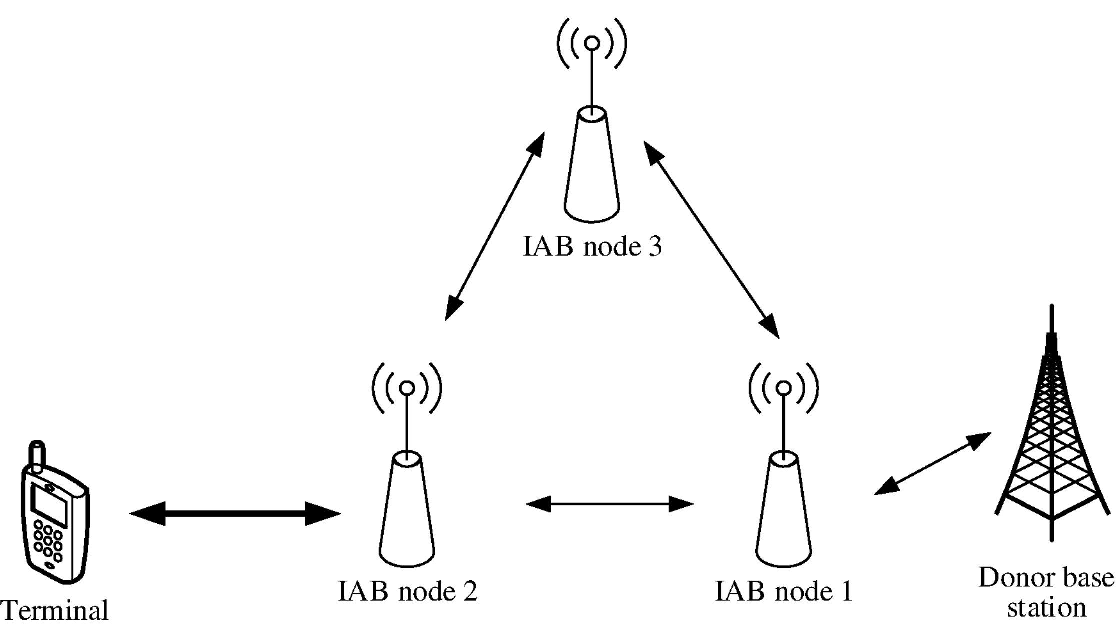
FIG. 5 is a schematic diagram of an architecture of an exemplary communication system to which an embodiment of this application is applicable.

As another example, refer to FIG. 5, which is an example of a communication system including one terminal and a plurality of IAB nodes. FIG. 5 uses an example in which one terminal and three IAB nodes are included. The three IAB nodes are an IAB node 1, an IAB node 2, and an IAB node 3. Different from FIG. 4, in FIG. 5, the terminal may access the donor base station through two paths. One path goes through the terminal, the IAB node 2, the IAB node 1, and the donor base station sequentially; and the other path goes through the terminal, the IAB node 2, the IAB node 3, the IAB node 1, and the donor base station sequentially. The terminal accesses the donor base station through a plurality of paths, which may be understood as a multi-connection wireless backhaul scenario, and service transmission reliability can be ensured. Compared with FIG. 4, an architecture shown in FIG. 5 may be understood as a multi-hop+ multi-connection networking scenario.

Figure 6:
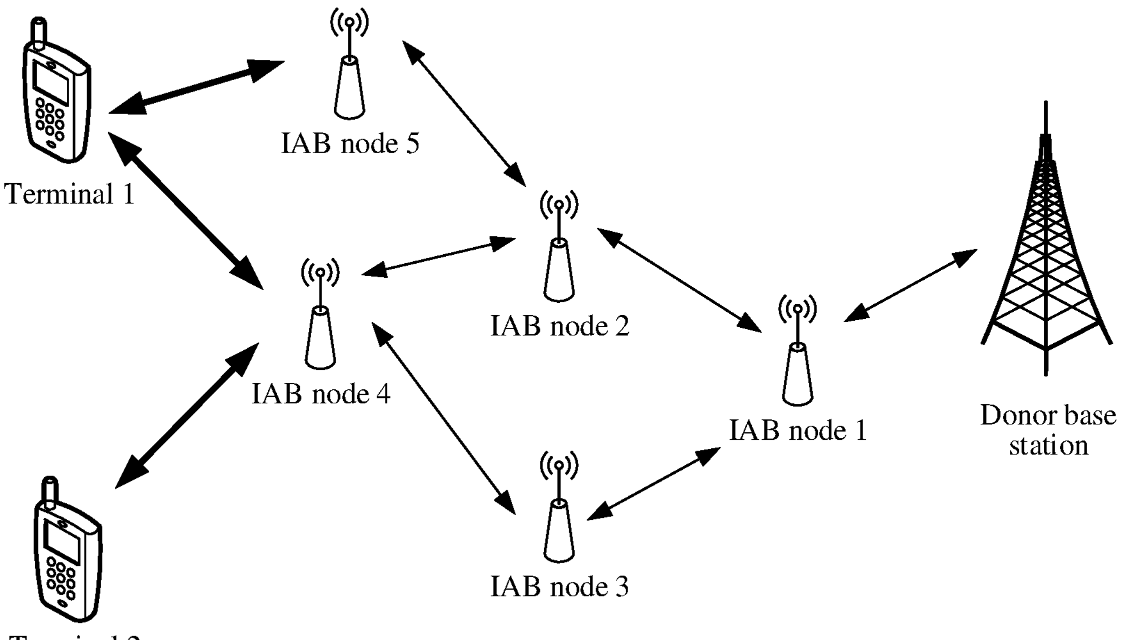
FIG. 6 is a schematic diagram of an architecture of an exemplary communication system to which an embodiment of this application is applicable.

As another example, refer to FIG. 6, which is an example of a communication system including a plurality of terminals and a plurality of IAB nodes. FIG. 6 uses an example in which two terminals and five IAB nodes are included. The two terminals are a terminal 1 and a terminal 2, and the five IAB nodes are an IAB node 1 to an IAB node 5. It should be understood that a thick line in FIG. 6 represents an access link, and a thin line represents a backhaul link. The terminal 1 may be connected to the donor base station through the IAB node 5, the IAB node 2, and the IAB node 1. The terminal 1 may alternatively be connected to the donor base station through the IAB node 4, the IAB node 2, and the IAB node 1. Alternatively, the terminal 1 may be connected to the donor base station through the IAB node 4, the IAB node 3, and the IAB node 1. The terminal 2 may be connected to the donor base station through the IAB node 4, the IAB node 3, and the IAB node 1. The terminal 2 may be connected to the donor base station through the IAB node 4, the IAB node 2, and the IAB node 1.

It should be noted that network structures shown in FIG. 4 to FIG. 6 are merely examples, and do not constitute a limitation on an application scenario to which embodiments of this application are applicable. For example, embodiments of this application may also be applicable to a scenario in which the terminal communicates with the donor base station through one IAB node. Examples are not given one by one herein.

It should be understood that an F1 interface is to be established between a DU of an IAB node and a CU of an IAB donor, and a route and bearer mapping configuration is to be completed, so that data transmission between the IAB node and a target IAB donor is performed based on the configuration. Certainly, the F1 interface may also be referred to as an F1* interface. A name of the interface is not limited in embodiments of this application. An example in which the interface is referred to as the F1 interface is used in this specification.

The F1 interface may support a user plane protocol (F1-U/F1*-U) and a control plane protocol (F1-C/F1*-C). The user plane protocol includes one or more of the following protocol layers: a general packet radio service (GPRS) tunnelling protocol user plane (GTP-U) protocol layer, a user datagram protocol (UDP) protocol layer, an internet protocol (IP) protocol layer, and the like. The control plane protocol includes one or more of the following protocol layers: an F1 application protocol (F1AP) layer, a stream control transport protocol (SCTP) layer, an IP protocol layer, and the like. By using a control plane of the F1/F1* interface, interface management, IAB-DU management, terminal context-related configuration, and the like, may be performed between the IAB node and the IAB donor. By using a user plane of the F1/F1* interface, a function, such as user plane data transmission or downlink transmission state feedback, may be performed between the IAB node and the IAB donor.

Figure 7:
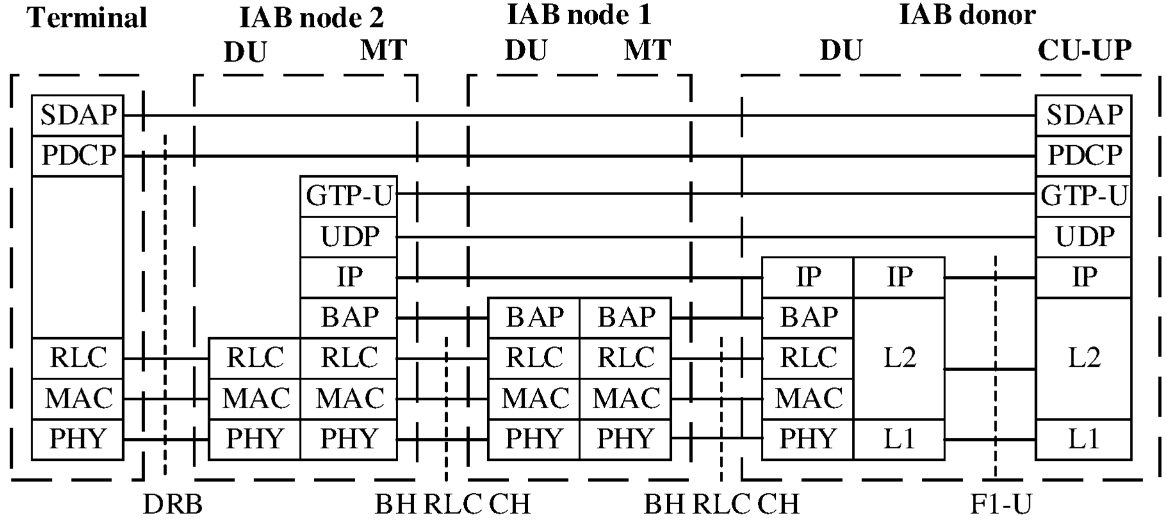
FIG. 7 is a schematic diagram of a user plane protocol stack of an IAB node according to an embodiment of this application.
Figure 8:
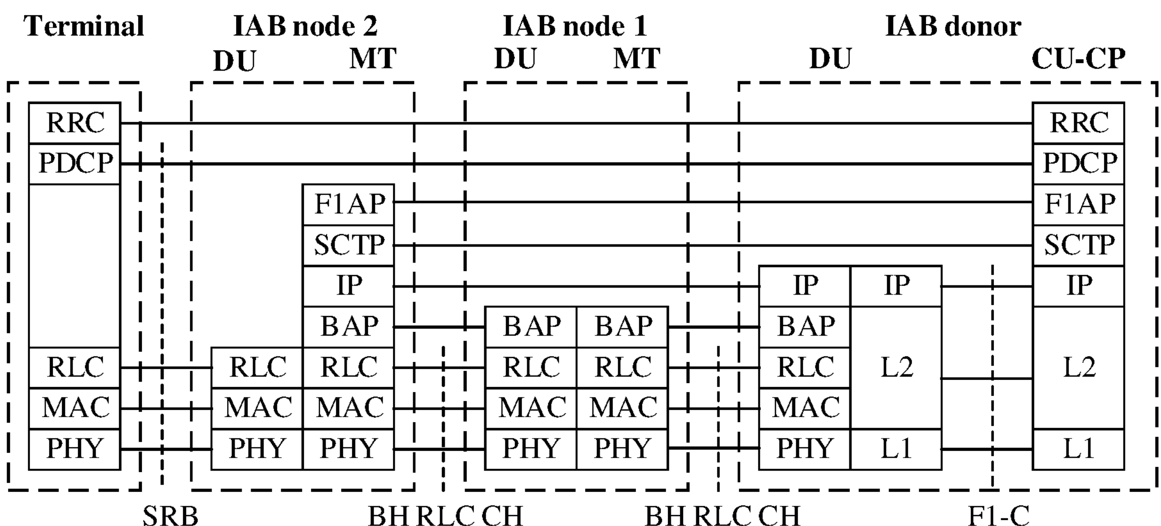
FIG. 8 is a schematic diagram of a control plane protocol stack of an IAB node according to an embodiment of this application.

For example, refer to FIG. 7 and FIG. 8, where FIG. 7 is a schematic diagram of a user plane protocol architecture in an IAB network, and FIG. 8 is a schematic diagram of a control plane protocol architecture in an IAB network.

In FIG. 7, for a user plane, a Uu interface is established between a terminal and an IAB 2 DU, and a peer-to-peer protocol layer includes an RLC layer, an MAC layer, and a PHY layer. An F1-U interface is established between the IAB node 2 DU and an IAB donor CU-UP, and a peer-to-peer protocol layer includes a GPRS tunnelling protocol for the user plane (GTP-U) layer and a user datagram protocol (UDP) layer. The IAB donor DU 1 and the IAB donor-CU 1 are connected in a wired manner, and a peer-to-peer protocol layer includes an IP layer, an L2, and an L1. BLs are established between an IAB node 2 and an IAB node 1, and between the IAB node 1 and an IAB donor DU, and a peer-to-peer protocol layer includes a BAP layer, an RLC layer, an MAC layer, and a PHY layer. In addition, a peer-to-peer SCTP layer and packet data convergence protocol (PDCP) layer are established between the terminal and the IAB donor CU-UP, and a peer-to-peer IP layer is established between the IAB node 2 DU and the IAB donor DU-UP.

It can be learned that, comparing a user plane protocol stack of the IAB network with a user plane protocol stack of a single air interface, a DU of an IAB access node implements a part of functions (that is, a function of establishing a peer-to-peer radio link control (RLC) layer, media access control (MAC) layer, and PHY layer with the terminal, and a function of establishing a peer-to-peer GTP-U layer and UDP layer with the IAB donor CU-UP) of a gNB-DU of the single air interface. It may be understood that the DU of the IAB access node (IAB node 2) implements a function of the gNB-DU of the single air interface; and the IAB donor CU-UP implements a function of a gNB-CU of the single air interface.

On the user plane, a PDCP data packet is encapsulated in a GTP-U tunnel between an access IAB node (IAB node 2) and the IAB donor CU-UP for transmission. The GTP-U tunnel is established on the F1-U interface.

For a control plane, as shown in FIG. 8, a Uu interface is established between a terminal and an IAB node 2 DU, and a peer-to-peer protocol layer includes an RLC layer, an MAC layer, and a PHY layer. An F1-C interface is established between an IAB node 2 DU and an IAB donor CU 1, and a peer-to-peer protocol layer includes an F1 application protocol (F1AP) layer and an SCTP layer. An IAB donor DU and the IAB donor CU-UP are connected in a wired manner, and a peer-to-peer protocol layer includes an IP layer, an L2, and an L1. BLs are established between an IAB node 2 and an IAB node 1, and between the IAB node 1 and the IAB donor DU, and a peer-to-peer protocol layer includes a backhaul adaptation protocol (BAP) layer, an RLC layer, an MAC layer, and a physical (PHY) layer. In addition, a peer-to-peer RRC layer and PDCP layer are established between the terminal and the IAB donor CU-UP, and a peer-to-peer IP layer is established between the IAB node 1-DU and the IAB donor DU. The BAP layer has at least one of the following capabilities: adding routing information (Routing info) that can be identified by the IAB node to a data packet, performing route selection based on the routing information that can be identified by the IAB node, and performing quality of service (QoS) mapping on a plurality of links including the IAB node for the data packet. Bearer mapping on the plurality of links may be: performing, on a backhaul link based on an identifier of a radio bearer (RB) of the terminal carried in the data packet, mapping from an RB of the terminal to an RLC bearer, an RLC channel, or a logical channel on the backhaul link. For example, the BAP executes a data radio bearer (DRB) or a signaling radio bearer (SRB) of the terminal to an RLC bearer on the backhaul link. Based on a correspondence between any two or more of an RLC bearer, an RLC channel, and a logical channel of an ingress link (that is, a link for receiving a data packet) and an egress link (that is, a link for sending a data packet), mapping from an RB or an RLC bearer or an RLC channel or a logical channel of the ingress link to an RB or an RLC bearer or an RLC channel or a logical channel of the egress link is performed. In FIG. 7 or FIG. 8, a channel, for example, a backhaul (BH) RLC channel (CH), is used as an example of the RLC bearer.

It can be learned that, comparing a control plane protocol stack of the IAB network with a control plane protocol stack of the single air interface, a DU of an access IAB node (IAB node 2) implements a function (that is, a function of establishing a peer-to-peer RLC layer, MAC layer, and PHY layer with the terminal, and a function of establishing a peer-to-peer F1AP layer and SCTP layer with the CU) of a gNB-DU of the single air interface. It may be understood that the DU of the access IAB node in the IAB network implements a function of the gNB-DU of the single air interface; and the IAB donor C-CP implements a function of a gNB-CU of the single air interface.

On the control plane, an RRC message is encapsulated in an F1AP message between the access IAB node and the IAB donor CU-UP for transmission. For example, in an uplink direction, the terminal encapsulates the RRC message in a PDCP protocol data unit (PDU), and the RRC message is sent to the IAB node 2 DU after being processed by the RLC layer, MAC layer, and PHY layer sequentially. The IAB node 2 DU obtains the PDCP PDU after a process of the PHY layer, MAC layer, and RLC layer sequentially, encapsulates the PDCP PDU in the F1AP message, and obtains an IP packet after a process of the SCTP layer and IP layer sequentially. An IAB node 2-MT sends the IP packet to the IAB node 1 DU after a process of the BAP layer, RLC layer, MAC layer, and PHY layer. Similarly, the IAB node 1-MT sends the IP packet to the IAB donor DU. After obtaining the IP packet through parsing, the IAB donor DU sends the IP packet to the IAB donor CU-UP, and the IAB donor CU-UP obtains the RRC message after a process of the SCTP layer, F1AP layer, and PDCP layer. Operations in a downlink direction are similar, and details are not described herein again.

It should be noted that one IAB node may play one or more roles. The IAB node may have a protocol stack of the one or more roles. Alternatively, the IAB node may have a set of protocol stacks, and for different roles of the IAB node, protocol layers corresponding to the different roles may be used in the protocol stacks for processing. The following uses an example in which the IAB node has a protocol stack of the one or more roles for description.

(1) Protocol Stack of a Common Terminal

When accessing the IAB network, the IAB node may serve as a common terminal. In this case, an MT of the IAB node has a protocol stack of a common terminal, for example, the protocol stack of the terminal in FIG. 7 and FIG. 8, that is the RRC layer, PDCP layer, RLC layer, MAC layer, and PHY layer. On a control plane, an RRC message of the IAB node is encapsulated in an FAP message between a parent node of the IAB node and the IAB donor CU for transmission. On a user plane, a PDCP data packet of the IAB node is encapsulated in a GTP-U tunnel between a parent node of the IAB node and the IAB donor-CU for transmission.

In addition, after accessing the IAB network, the IAB node may still serve as the common terminal, for example, transmitting an uplink and/or a downlink data packet of the IAB node to an IAB donor, performing measurement through the RRC layer, and the like.

(2) Protocol Stack of an Access IAB Node

After accessing the IAB network, the IAB node may provide an access service for a terminal, thereby serving as one access IAB node. In this case, the IAB node has a protocol stack of an access IAB node, for example, the protocol stack of the IAB node 2 in FIG. 7 and FIG. 8.

In this case, there may be two sets of protocol stacks on an interface of the IAB node facing a parent node of the IAB node. One is the protocol stack of a common terminal, and the other is a protocol stack (namely, the protocol stack of an access IAB node) that provides a backhaul service for the terminal. Optionally, sharing may be performed on a same protocol layer of the two sets of protocol stacks, for example, a same RLC layer, MAC layer, PHY layer, or BAP layer, to which the two sets of protocol stacks both correspond.

(3) Protocol Stack of an Intermediate IAB Node

After accessing the IAB network, the IAB node may serve as one intermediate IAB node. In this case, the IAB node has a protocol stack of an intermediate IAB node, for example, the protocol stack of the IAB node 1 in FIG. 7 and FIG. 8.

In this case, there may be two sets of protocol stacks on an interface of the IAB node facing a parent node of the IAB node. One is the protocol stack of a common terminal, and the other is a protocol stack (namely, the protocol stack of an intermediate IAB node) that provides a backhaul service for a child IAB node. Optionally, sharing may be performed on a same protocol layer of the two sets of protocol stacks, for example, a same RLC layer, MAC layer, PHY layer, or BAP layer, to which the two sets of protocol stacks both correspond.

In addition, the IAB node may serve as an access IAB node and an intermediate IAB node simultaneously. For example, the IAB node may be an access IAB node for some terminals and an intermediate IAB node for other terminals. In this case, the IAB node may have three sets of protocol stacks. One is the foregoing protocol stack of a common terminal, one is the protocol stack of an access IAB node, and one is the protocol stack of an intermediate IAB node. Optionally, sharing may be performed on a same protocol layer of the three sets of protocol stacks, for example, a same RLC layer, MAC layer, PHY layer, or BAP layer, to which the three sets of protocol stacks all correspond.

It should be noted that FIG. 7 and FIG. 8 use the IAB network as an example for description. Content of FIG. 7 and FIG. 8 is also applicable to another type of relay network other than the IAB network, where a control plane protocol stack architecture of the relay network may be referred to FIG. 8, and a user plane protocol stack architecture of the relay network may be referred to FIG. 7. The IAB node in FIG. 7 and FIG. 8 may be replaced with a relay. For example, the IAB node 2 may be replaced with a relay node 2, the IAB node 1 may be replaced with a relay node 1, and the IAB donor may be replaced with a donor node. The donor node has a CU and a DU protocol stack. Other content is the same as the content described in FIG. 7 and FIG. 8. For details, refer to the descriptions in FIG. 7 and FIG. 8, which are not described herein again.

Figure 9:
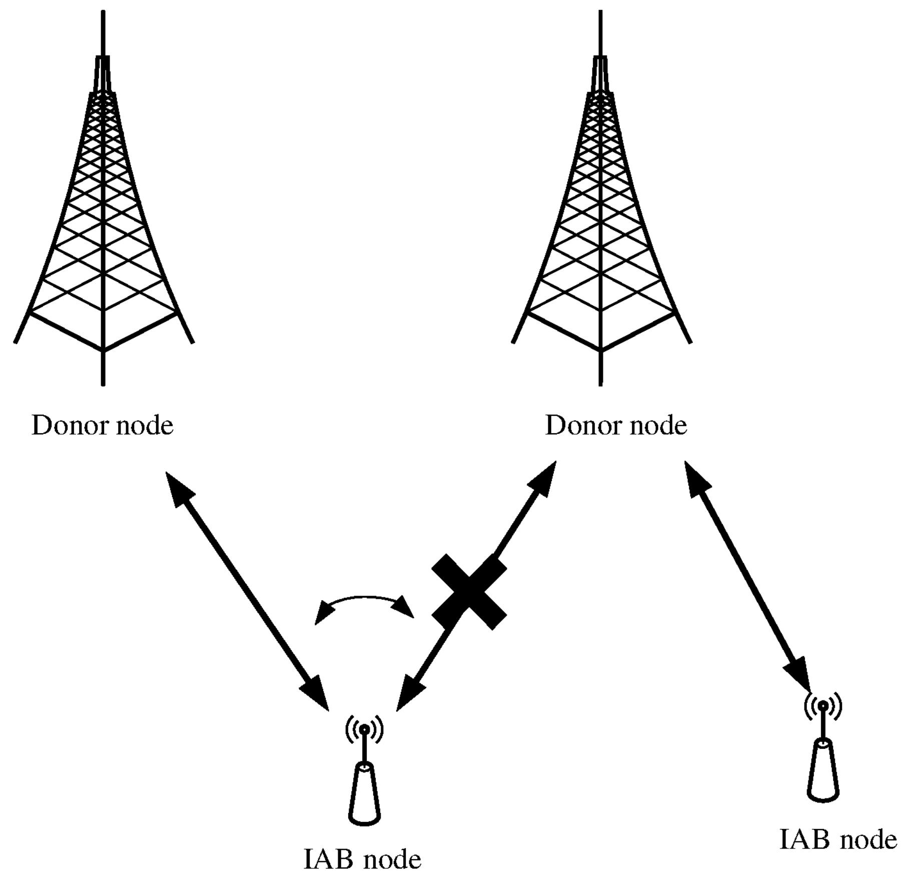
FIG. 9 is a schematic diagram of cross-donor handover of an IAB node according to an embodiment of this application.

In a possible application scenario, as shown in FIG. 9, FIG. 9 is a schematic diagram of cross-donor node handover of an IAB node. If a backhaul link between an IAB node and an upper-level node (that is, a donor node) to which the IAB node is directly connected is interrupted or communication quality of the backhaul link deteriorates, to ensure the communication quality of the backhaul link of the IAB node, the backhaul link of the IAB node may be migrated to another upper-level node (that is, another donor node in FIG. 9), which involves the cross-donor node handover. It should be noted that one or more IAB nodes may be further included between the IAB node and the two donor nodes, and a downstream of the IAB node may further include one or more IAB nodes.

Figure 10:
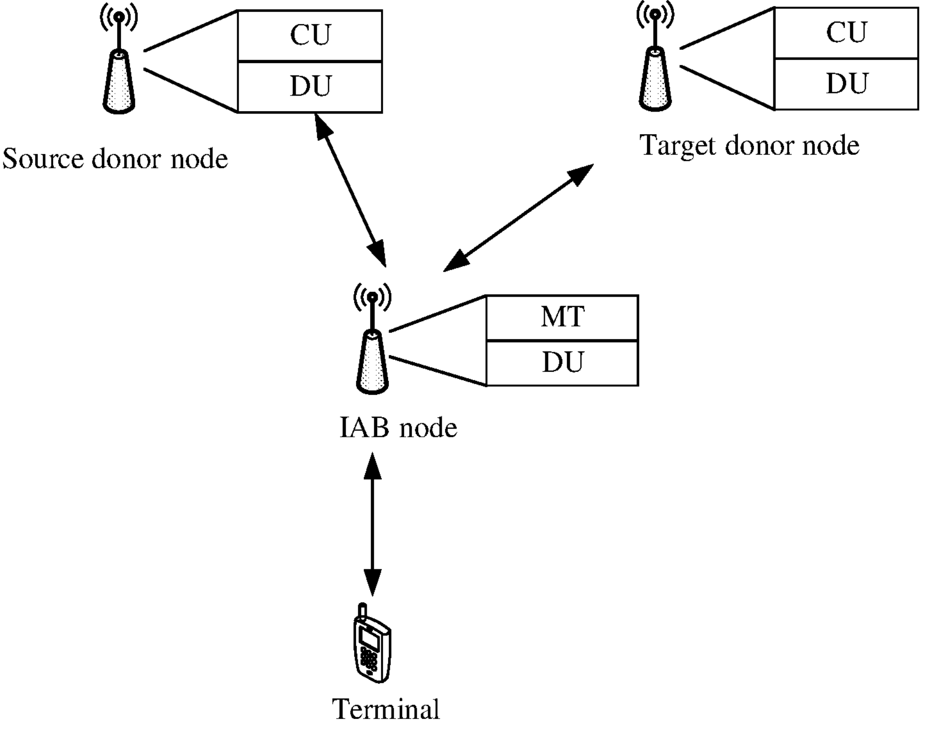
FIG. 10 is another schematic diagram of cross-donor handover of an IAB node according to an embodiment of this application.

For example, refer to FIG. 10, which is another example of FIG. 9. Because the IAB node includes an MT and a DU, for the MT, a handover mechanism of the terminal may still be used, that is, a source IAB donor (a current serving base station) will send a measurement configuration to the MT. The MT performs measurement based on a configuration, and determines, based on a preconfigured threshold, whether to report a measurement result. The source IAB donor decides, based on the received measurement result, whether to allow the MT to perform handover (that is, decides whether to allow the IAB node to perform handover). If the source IAB donor decides to allow the MT or the IAB node to perform handover, the source IAB donor will send a handover request to a target IAB donor. The target IAB donor determines, based on the handover request of the source IAB donor, whether to allow the MT or the IAB node to perform handover, and if yes, sends a handover request response to the source IAB donor, where the handover request response carries configurations such as a random access resource for the MT and a transmission direction of a time domain resource of the MT.

However, for the DU, a configuration of the DU is configured by the source IAB donor. In this way, a resource conflict may exist between the configuration of the MT and the configuration of the DU. For example, for an IAB node constrained by half-duplex, a DU of the IAB node may serve one or more terminals and serve as a function of a base station. Generally, the DU is configured for downlink transmission. For example, the DU is configured to send a synchronization signal block (SSB) to a terminal to serve the terminal. To avoid affecting the terminal, a resource location of the SSB generally does not change. However, when the IAB node performs the cross-donor node handover, if the target IAB donor sends an SSB measurement configuration to the MT of the IAB node for the MT to receive and measure an SSB of an upper-level node, such MT is configured for the downlink transmission. Due to a half-duplex constraint, the IAB node cannot send the SSB and receive an SSB from another device simultaneously. If a resource location at which the target IAB donor sends the SSB overlaps a resource location at which the DU of the IAB node sends the SSB, the resource conflict is caused.

In view of this, an embodiment of this application provides an IAB node handover method. In the method, a target IAB donor may configure an MT and/or a DU of an IAB node based on a duplex capability of the IAB node, that is, configure the MT and/or the DU of the IAB node based on whether the MT and the DU of the IAB node allow simultaneous sending and/or receiving. Because the duplex capability of the IAB node is a premise for a configuration of the MT and the DU of the IAB node, in a process of implementing the cross-donor node handover of the IAB node, a conflict between sending, for example, an SSB resource by the DU of the IAB node and sending the SSB resource by the MT of the IAB node can be avoided, thereby avoiding a receiving or sending failure caused by the resource conflict, and avoiding an unnecessary packet loss.

The following describes the IAB node configuration method provided in embodiments of this application in detail with reference to the accompanying drawings.

Refer to FIG. 11, which is a flowchart of the IAB node configuration method provided in embodiments of this application. The following description process uses an example in which the method is applied to the communication system shown in FIG. 9 and FIG. 10. In addition, the method may be performed by three communication apparatuses. The three communication apparatuses are, for example, a first communication apparatus, a second communication apparatus, and a third communication apparatus. For ease of description, an example in which the method is performed by an IAB node, a source IAB donor, and a target IAB donor is used below. In other words, an example in which the first communication apparatus is the IAB node, the second communication apparatus is the source IAB donor, and the third communication apparatus is the target IAB donor is used. The IAB node may be an IAB node that performs handover, or may be a downstream IAB node of the IAB node that performs handover. It should be noted that the communication system in FIG. 7 and FIG. 8 are used as merely an example in this embodiment of this application, which is not limited to this scenario.

It should be understood that the IAB node includes an MT and a DU. The MT may be configured to communicate with an upper-level node of the IAB node or the source IAB donor or the target IAB donor. The DU may be configured to communicate with a lower-level node of the IAB node or a terminal. The source IAB donor refers to a donor base station to which the IAB node is connected currently. The IAB node herein refers to an IAB node to be handed over, or may be referred to as a to-be-migrated IAB node, that is, an IAB node of a source donor base station to which the IAB node is connected currently is to be handed over. It should be noted that a subsequent solution involved in the present application is also applicable to a downstream IAB node of the IAB node to be handed over. The target IAB donor refers to a base station to which the IAB node will be migrated or handed over. In this specification, the source IAB donor may also be referred to as a source IAB Donor, and the target IAB donor may be referred to as a target IAB Donor. It should be noted that when the IAB donor exists in a form in which a central unit (CU) (Donor-CU or gNB-CU for short in this application) and a distributed unit (DU) (Donor-DU or gNB-DU for short in this application) are separated, the IAB donor or the donor base station in subsequent embodiments refers to the central unit of the IAB donor.

A procedure of the communication method provided in embodiments of this application is described as follows.

S1101: The source IAB donor sends first information to the target IAB donor, and the target IAB donor receives the first information, where the first information indicates a duplex capability of an IAB node.

In this embodiment of this application, the duplex capability of the IAB node means whether it is supported that an MT of the IAB node receives or sends data and a DU receives or sends data simultaneously on a same time domain resource. In other words, the duplex capability of the IAB node is specific to a transmission direction (also referred to as a transmission direction of a time domain resource) in which the MT and the DU of the IAB node perform transmission on data on the same time domain resource. If the IAB node does not support that both the MT and the DU have a same transmission direction on the same time domain resource, but in the cross-donor handover process of the IAB node, a transmission direction of a time domain resource configured by the target IAB donor for the MT is the same as a transmission direction of a time domain resource of the DU, a time domain resource conflict will be caused apparently, and a communication exception of the IAB node may further be caused.

Therefore, in the cross-donor handover process of the IAB node, the source IAB donor determines the duplex capability of the IAB node, may generate the first information, and send the first information to the target IAB donor. The first information may indicate the duplex capability of the IAB node. Because the source IAB donor notifies the target IAB donor of the duplex capability of the IAB node, the target IAB donor configures the transmission direction of the time domain resource for the MT based on the duplex capability, so that a conflict between the transmission direction of the time domain resource of the MT and the transmission direction of the time domain resource of the DU can be avoided.

It should be noted that, because the first information may indicate the duplex capability of the IAB node, in some embodiments, the first information may be referred to as duplex information. Alternatively, the duplex capability of the IAB node means whether the MT and the DU of the IAB node can multiplex a same time domain resource. Therefore, in some embodiments, the first information may be referred to as multiplexing information or a multiplexing capability. The first information is used uniformly below. The first information may indicate one or more of the following four cases.

A first case is whether the IAB node supports that the MT receives data and the DU sends data simultaneously. In other words, it may be considered as whether the IAB node has a capability of receiving data by the MT and sending data by the DU simultaneously. For ease of description, the capability of receiving data by the MT and sending data by the DU simultaneously may be referred to as a first capability below. On the contrary, if the IAB node does not support that the MT receives data and the DU sends data simultaneously, the IAB node does not have the first capability.

A second case is whether the IAB node supports that the MT receives data and the DU receives data simultaneously. Similarly, the IAB node has a capability of receiving data by the MT and receiving data by the DU simultaneously, which may be considered as that the IAB node has a second capability. On the contrary, if the IAB node does not support that the MT receives data and the DU receives data simultaneously, the IAB node does not have the second capability.

A third case is whether the IAB node supports that the MT sends data and the DU sends data simultaneously. Similarly, the IAB node has a capability of sending data by the MT and sending data by the DU simultaneously, which may be considered as that the IAB node has a third capability. On the contrary, if the IAB node does not support that the MT sends data and the DU sends data simultaneously, the IAB node does not have the third capability.

A fourth case is whether the IAB node supports that the MT sends data and the DU receives data simultaneously. Similarly, the IAB node has a capability of sending data by the MT and receiving data by the DU simultaneously, which may be considered as that the IAB node has a fourth capability. On the contrary, if the IAB node does not support that the MT sends data and the DU receives data simultaneously, the IAB node does not have the fourth capability.

It should be noted that the foregoing four cases are for one or more cells on the DU and one or more cells on the MT. In other words, for each MT cell and each DU pairing, duplex capabilities between them are independent. Whether it is supported that the MT receives or sends data and the DU receives or sends data simultaneously means whether it is supported that a specific cell of the MT receives or sends data and a specific cell of the DU receives or sends data simultaneously.

It should be understood that the MT is configured to communicate with an upper-level node of the IAB node or the source IAB donor. If the IAB node can directly communicate with the source IAB donor, the MT may directly send the duplex information of the IAB node to the source IAB donor of the IAB node. If an upper-level node of the IAB node exists between the IAB node and the source IAB donor, the MT may report the duplex information of the IAB node to the upper-level node of the IAB node, and the upper-level node forwards the duplex information to the source IAB donor.

In some embodiments, one or more fields of existing signaling may bear the first information, which helps the first information to be compatible with the existing signaling. For example, X2/Xn interface signaling between a CU node of the source IAB donor and a CU node of the target IAB donor may bear the first information. The foregoing one or more fields may be a field defined by the X2/Xn interface signaling, or may be newly defined X2/Xn interface signaling. This is not limited in this embodiment of this application. Certainly, newly defined signaling may also bear the first information.

As an example, the first information may be carried in the Xn interface signaling between the CU node of the source IAB donor and the CU node of the target IAB donor. For example, the first information may be carried in a first request message that is sent by the source IAB donor to the target IAB donor through the Xn interface signaling, where the first request message is for requesting to hand over the IAB node from the source IAB donor to the target IAB donor. Because the first request message is for requesting to hand over the IAB node from the source IAB donor to the target IAB donor, in some embodiments, the first request message may be referred to as a handover request message. For example, a field may be newly added to the handover request message, and the newly added field may bear the first information.

It should be understood that, when no X2/Xn interface exists between the source IAB donor and the target IAB donor, because a core network device between the source IAB donor and the target IAB donor may communicate with both the source IAB donor and the target IAB donor, the source IAB donor may forward the first information to the target IAB donor through the core network device. That is, the source IAB donor sends the first information to the core network device, and the core network device may not parse the first information, but transparently transmit the first information to the target IAB donor after encapsulating the first information at a protocol layer, or the core network device may parse the first information and then send the first information to the target IAB donor. The core network device may be a mobility management entity (MME) or an access and mobility management function (AMF).

S1102: The target IAB donor sends first configuration information to the source IAB donor, and the source IAB donor receives the first configuration information, where the first configuration information indicates a transmission direction of a time domain resource configured by the target IAB donor for an MT function of the IAB node.

After receiving the first information, the target IAB donor may configure the MT based on the first information, and generate the first configuration information. For example, the target IAB donor may configure the transmission direction of the time domain resource of the MT for the IAB node based on the first information. For example, the first information indicates that it is not supported that the MT receives data and the DU receives data simultaneously, that is, the IAB node does not have the second capability. In this case, in a time domain unit, if the direction of the time domain resource of the DU is an uplink transmission direction, the target IAB donor cannot configure the transmission direction of the time domain resource as a downlink transmission direction for the MT. It should be noted that the time domain unit may be a symbol or a slot, for example, a time domain resource indication granularity such as a slot in LTE or a slot in NR. Because the first information is a premise of the transmission direction of the time domain resource configured for the MT function, during implementing the cross-donor handover process of the IAB node, a receiving and sending conflict between the DU function and the MT function of the IAB node can be avoided, and further, a communication exception on a link between the IAB node and a lower-level node of the IAB node or a link between the IAB node and an upper-level node of the IAB node can be avoided.

As an example, the first configuration information may include a slot format configuration of the MT, for example, a TDD uplink slot configuration and a TDD downlink slot configuration (TDD-UL-DL-ConfigDedicated and/or TDD-UL-DL-ConfigCommon) of the IAB node, and is mainly used to configure a resource transmission direction of one or more symbols or slots on a time domain resource, for example, an uplink transmission direction, a downlink transmission direction, or a flexible transmission direction. The MT of the IAB node communicates with a DU of the upper-level node of the IAB node based on the slot format configuration of the MT. It should be understood that the flexible transmission direction may be considered as a to-be-determined transmission direction, and may be subsequently used as an uplink transmission direction, or may be used as a downlink transmission direction. Whether the subsequent flexible transmission direction is used as a downlink transmission direction or an uplink transmission direction may be indicated by the target IAB donor or a parent node.

It should be understood that the target IAB donor may send the first configuration information to the source IAB donor, and the source IAB donor forwards the first configuration information to the IAB node. After receiving the first configuration information, the source IAB donor may send the first configuration information of the MT to the IAB node through RRC signaling.

Similar to the first information, the one or more fields of existing signaling may also bear the first configuration information. For example, one or more of RRC signaling, MAC CE signaling, DCI signaling, the X2/Xn interface signaling between a CU node of the source IAB donor and a CU node of the target IAB donor, or the like, may bear the first configuration information. The foregoing one or more fields may be a defined field of the RRC signaling, a defined field of the MAC CE signaling, or a defined field of the DCI signaling or the X2/Xn interface signaling, or may be a newly defined RRC field, MAC CE field, DCI field, or X2/Xn interface signaling. This is not limited in this embodiment of this application. Certainly, the newly defined signaling may also bear the first configuration information.

As an example, the first configuration information may be carried in the Xn interface signaling between the CU node of the target IAB donor and the CU node of the source IAB donor. For example, the first configuration information may be carried in a first request response message sent by the target IAB donor to the source IAB donor through the Xn interface signaling, where the first request response message is a response message sent by the source IAB donor to the target IAB donor in response to the first request message. Because the first request response message responds to the first request message, in some embodiments, the first request message may be referred to as a handover request response message. For example, a field may be newly added to the handover request response message, and the newly added field may bear the first configuration information.

It should be understood that when no X2/Xn interface exists between the target IAB donor and the source IAB donor, the target IAB donor may forward the first configuration information to the source IAB donor through the core network device. It should be understood that the core network device may communicate with both the source IAB donor and the target IAB donor. That is, the target IAB donor sends the first configuration information to the core network device, and the core network device may not parse the first configuration information, but transparently transmit the first configuration information to the source IAB donor after encapsulating the first configuration information at a protocol layer, or the core network device may parse the first configuration information and then send the first configuration information to the source IAB donor. The core network device may be a mobility management entity (MME) or an access and mobility management function (AMF).

S1103: The source IAB donor sends second information to the target IAB donor, and the target IAB donor receives the second information, where the second information indicates a transmission direction of a time domain resource configured by the source IAB donor for the DU, and/or the second information indicates a status of the transmission direction of the time domain resource configured by the source IAB donor for the DU.

It should be understood that the DU of the IAB node is configured by the source IAB donor, and in a process of the cross-donor handover of the IAB node, the MT of the IAB node is configured by the target IAB donor. To avoid a possible conflict between the configuration of the MT and the configuration of the DU, the source IAB donor may provide the configuration of the DU for the target IAB donor. In this way, the target IAB donor may configure the MT with reference to the configuration of the DU by the source IAB donor, to avoid a conflict between the configuration of the MT and the configuration of the DU.

As an example, the source IAB donor may generate second information, where the second information may indicate a transmission direction of a time domain resource configured by the source IAB donor for the DU. For example, the second information may include time domain resource configuration information of one or more cells of the DU. For example, the second information may indicate one or more of the following: one or more slots (or symbols) configured for each cell of the DU are uplink slots (or uplink symbols), one or more slots (or symbols) configured for each cell of the DU are downlink slots (or downlink symbols), and one or more slots (or symbols) configured for each cell of the DU are flexible slots (or flexible symbols). The second information may further include a status of the transmission direction of the time domain resource configured for the DU, for example, an available state, a conditionally available state, or a not available state. If the status of the transmission direction of the time domain resource is a hard state, it may be considered that the time domain resource configured for the DU is available. If the status of the transmission direction of the time domain resource is a soft state, it may be considered that whether the time domain resource configured for the DU is available (that is, the conditionally available state) can be determined based on further indication of the parent node. If the status of the transmission direction of the time domain resource is a not available (NA) state, it may be considered that the time domain resource configured for the DU is unavailable. Certainly, in some embodiments, the second information may indicate the transmission direction of the time domain resource configured by the source IAB donor for the DU and a status of the transmission direction of the time domain resource configured by the source IAB donor for the DU.

The target IAB donor may configure the MT based on the first information and the second information, that is, the target IAB donor configures the MT based on the duplex capability of the IAB node and the configuration of the DU by the source IAB donor. The first configuration information generated by the target IAB donor may be a part of configuration information of the MT, that is, a configuration that conflicts with the configuration of the DU is reconfigured, and other configurations may be the same as the configuration of the MT by the source IAB donor. In this case, another part of configuration information of the MT may be indicated by a network side as original configuration information of the MT of the IAB node. In other words, the network side indicates that during migration, the IAB node uses a received part of configuration information (that is, the first configuration information) of the MT and another part of configuration information existing in the MT. Certainly, the network side does not necessarily send the signaling, and it may alternatively be agreed upon by a system or a protocol that during migration, the IAB node uses the received part of the configuration information of the MT and the another part of the configuration information existing in the MT. That is, for a configuration that is not in the received configuration information, the MT follows the existing configuration by default.

Similar to the first information, the one or more fields of existing signaling may also bear the second information. For example, the X2/Xn interface signaling between a CU node of the source IAB donor and a CU node of the target IAB donor may bear the second information. The foregoing one or more fields may be a field defined by the X2/Xn interface signaling, or may be newly defined X2/Xn interface signaling. This is not limited in this embodiment of this application. Certainly, newly defined signaling may also bear the second information.

The second information and the first information may be sent to the target IAB donor through one piece of signaling, that is, two types of information may be sent through one piece of signaling, which can reduce signaling overheads. Alternatively, the second information and the first information may be separately sent, that is, a manner of sending the second information is not limited, which is more flexible.

As an example, the second information may be carried in the Xn interface signaling between the CU node of the source IAB donor and the CU node of the target IAB donor. For example, the second information may be carried in the foregoing first request message (the handover request message) sent by the source IAB donor to the target IAB donor through the Xn interface signaling. For example, a field may be newly added to the handover request message, and the newly added field may bear the second information.

It should be understood that when no X2/Xn interface exists between the source IAB donor and the target IAB donor, the source IAB donor may forward the second information to the target IAB donor through the core network device. That is, the source IAB donor sends the second information to the core network device, and the core network device may not parse the second information, but transparently transmit the second information to the target IAB donor after encapsulating the second information at a protocol layer, or the core network device may parse the second information and then send the second information to the target IAB donor. The core network device may be an MME or an AMF.

It should be noted that, because the target IAB donor may configure the MT based on the first information, to avoid a conflict between the configuration of the MT and the configuration of the DU, the second information is not indispensable, that is, the second information is optional. Therefore, S1103 is an optional step, and is illustrated by using dashed lines in FIG. 11. In addition, the target IAB donor may also configure the MT based on the first information and the second information. In this case, S1103 may be performed before S1102, that is, a performing sequence of S1103 and S1102 in FIG. 9 is not limited.

S1104: The target IAB donor sends second configuration information to the source IAB donor, and the source IAB donor receives the second configuration information, where the second configuration information is determined based on the first information, and the second configuration information indicates a transmission direction of a time domain resource configured by the target IAB donor for the DU, and/or the second configuration information indicates a status of the transmission direction of the time domain resource configured by the target IAB donor for the DU.

In this embodiment of this application, considering that before the cross-donor handover, the configuration of the DU of the IAB node is configured by the source IAB donor, and after the cross-donor handover, the configuration of the MT of the IAB node is configured by the target IAB donor, in this case, the configuration of the DU may conflict with a new configuration of the MT, or the configuration of the DU configured by the source IAB donor may not be preferred. Therefore, the target IAB donor may further update the configuration of the DU function, to avoid a conflict between the configuration of the DU and the configuration of the MT, and improve utilization of the DU function configuration as much as possible.

For example, after receiving the first information, the target IAB donor may further configure the DU based on the first information, and generate the second configuration information. That is, in the cross-donor handover process of the IAB node, the target IAB donor may further update a configuration configured by the source IAB donor for the DU. For example, the first information indicates that it is not supported that the MT receives data and the DU receives data simultaneously. If the transmission direction of the time domain resource configured by the target IAB donor for the MT is a downlink transmission direction, but the transmission direction of the time domain resource configured by the source IAB donor for the DU is an uplink transmission direction, the target IAB donor may reconfigure the DU, that is, configure the transmission direction of the time domain resource for the DU as the downlink transmission direction, to ensure that the configuration of the MT does not conflict with the configuration of the DU.

Further, the target IAB donor may further configure the DU based on the first information and the second information, that is, reconfigure the DU based on the configuration configured by the source IAB donor for the DU. That is, the target IAB donor reconfigures the DU with reference to the configuration configured by the source IAB donor for the DU. In this way, the second configuration information generated by the target IAB donor may be a part of configuration information of the DU, that is, a configuration that conflicts with the MT configuration is reconfigured, and other configurations may be the same as the configuration of the DU by the source IAB donor. In this case, another part of configuration information of the DU may be indicated by a network side as original configuration information of the DU of the IAB node. In other words, the network side indicates that during migration, the IAB node uses a received part of configuration information (that is, the first configuration information) of the DU and another part of configuration information existing in the DU. Certainly, the network side does not necessarily send the signaling, and it may alternatively be agreed upon by a system or a protocol that during migration, the IAB node uses the received part of the configuration information of the DU and the another part of the configuration information existing in the DU. That is, for a configuration that is not in the received configuration information, the DU follows the existing configuration by default.

After determining the configuration for the DU, the target IAB donor may generate the second configuration information, and forward the second configuration information to the DU of the IAB node through the source IAB donor. That is, the target IAB donor may send the second configuration information to the source IAB donor, and the source IAB donor forwards the second configuration information to the IAB node. After receiving the second configuration information, the source IAB donor sends the second configuration information to the IAB node through an F1-AP message. In some embodiments, the F1-AP message may alternatively be borne in the RRC signaling for sending.

Similar to the second information, the second configuration information may indicate one or more of the transmission direction of the time domain resource configured by the target IAB donor for the DU and the status of the transmission direction of the time domain resource configured by the target IAB donor for the DU. The second configuration information may be time domain resource configuration information of one cell of the DU, or may be time domain resource configuration information of a plurality of cells of the DU. For example, the second information may indicate one or more of the following: one or more slots (or symbols) configured for each cell of the DU are uplink slots (or uplink symbols), one or more slots (or symbols) configured for each cell of the DU are downlink slots (or downlink symbols), and one or more slots (or symbols) configured for each cell of the DU are flexible slots (or flexible symbols). Alternatively, the second configuration information may indicate the status of the transmission direction of the time domain resource configured for the DU, for example, an available state, a conditionally available state, or a not available state. That is, the second configuration information may also include an available resource, an unavailable resource, a hard-type resource, a soft-type resource, and the like that are configured for the DU. Certainly, in some embodiments, the second configuration information may include a TDD uplink slot configuration and a TDD downlink slot configuration, and the available resource, the unavailable resource, the hard-type resource, the soft-type resource, and the like that are configured for the DU.

One or more fields of existing signaling may bear the second configuration information. For example, one or more of RRC signaling, MAC CE signaling, DCI signaling, X2/Xn interface signaling between a CU node of the source IAB donor and a CU node of the target IAB donor, or the like, may bear the second configuration information. The foregoing one or more fields may be a defined field of the RRC signaling, a defined field of the MAC CE signaling, or a defined field of the DCI signaling or the X2/Xn interface signaling, or may be a newly defined RRC field, MAC CE field, DCI field, or X2/Xn interface field. This is not limited in this embodiment of this application. Certainly, the newly defined signaling may also bear the first configuration information.

The second configuration information and the first configuration information may be sent to the target IAB donor through one piece of signaling, that is, two types of information may be sent through one piece of signaling, which can reduce signaling overheads. Alternatively, the second configuration information and the first configuration information may be separately sent, that is, a manner of sending the second configuration information is not limited, which is more flexible.

As an example, the second configuration information may be carried in the X2 interface signaling between the CU node of the target IAB donor and the CU node of the source IAB donor. For example, the second configuration information may be carried in the foregoing first request response message (the handover request response message) sent by the target IAB donor to the source IAB donor through the X2 interface signaling. For example, a field may be newly added to the handover request response message, and the newly added field may bear the second configuration information.

It should be understood that when no X2/Xn interface exists between the target IAB donor and the source IAB donor, the target IAB donor may forward the second configuration information to the source IAB donor through the core network device. That is, the target IAB donor sends the second configuration information to the core network device, and the core network device may not parse the second configuration information, but transparently transmit the second configuration information to the source IAB donor after encapsulating the second configuration information at a protocol layer.

It should be noted that the second configuration information is not mandatory to be configured by the target IAB donor, that is, S1104 is an optional step, and therefore, is illustrated by using dashed lines in FIG. 11.

To facilitate understanding of the technical solutions provided in embodiments of this application, the following describes several specific implementations of embodiments of this application.

Figure 12:
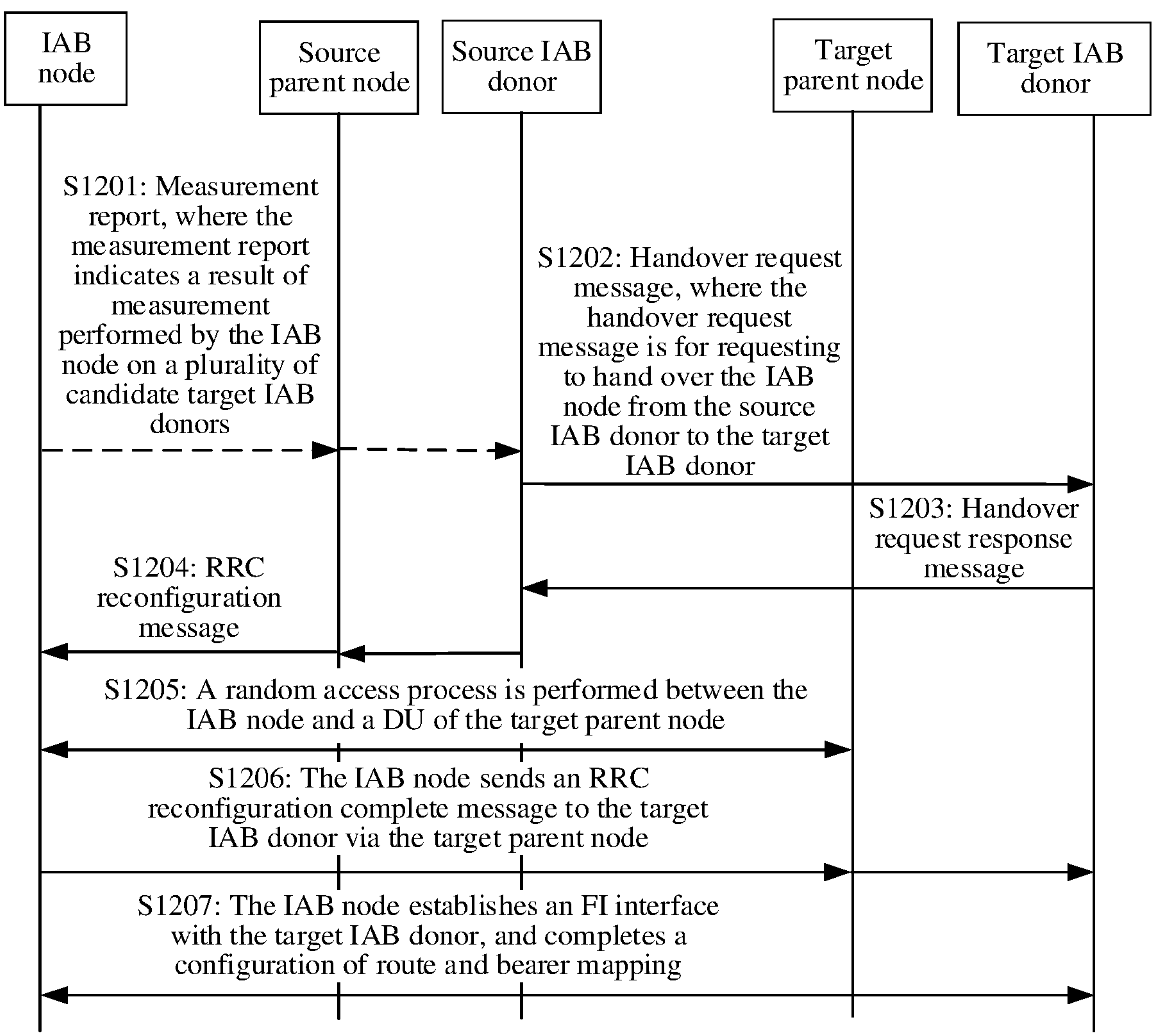
FIG. 12 is a schematic flowchart of an example of an IAB node configuration method according to an embodiment of this application.

Example 1: Refer to FIG. 12, which is a schematic flowchart of an example of the IAB node configuration method provided in embodiments of this application. In the following description, an example in which the method is applied to the communication system shown in FIG. 9 and FIG. 10 is used. In addition, an example in which the method is performed by an IAB node, a source IAB donor, and a target IAB donor is used. It should be noted that the communication system in FIG. 9 and FIG. 10 is used as merely an example in this embodiment of this application, which is not limited to this scenario. The process is described as follows.

S1201: An IAB node sends a measurement report to a source IAB donor, and the source IAB donor receives the measurement report, where the measurement report indicates a result of measurement performed by the IAB node on a plurality of candidate target IAB donors.

It should be understood that the source IAB donor may configure a measurement configuration for the IAB node, that is, measurement-related information. The measurement configuration may include, for example, a parameter for measuring the plurality of candidate target IAB donors. The IAB node measures the plurality of candidate target IAB donors based on the measurement configuration, and reports a measurement result to the source IAB donor. The source IAB donor may determine, from the plurality of candidate target IAB donors based on the measurement result, a target IAB donor to which the IAB node is to be migrated.

It should be noted that, in some embodiments, a source donor base station does not need to determine the target IAB donor based on a measurement result of the IAB node. For example, the source IAB donor may determine the target IAB donor based on historical information or network-specified information. Therefore, S1201 is an optional step, is not indispensable, and is illustrated by using dashed lines in FIG. 12.

It should be understood that if a parent node exists between the IAB node and the source IAB donor, the IAB node may send the measurement report to the source IAB donor via the parent node. That is, the IAB node sends the measurement report to the parent node, and the parent node may forward the received measurement report to the source IAB donor. For ease of description, in this specification, the parent node existing between the IAB node and the source IAB donor may be referred to as a source parent node (this is used as an example in FIG. 12). Similarly, a parent node between the IAB node and the target IAB donor is referred to as a target parent node (this is used as an example in FIG. 12). For example, the measurement report may be encapsulated in an F1-AP message between a DU of the source parent node and a CU of the source IAB donor. Certainly, the F1-AP message may alternatively be borne in RRC signaling for sending.

S1202: The source IAB donor sends a handover request message to the target IAB donor, where the handover request message is for requesting to hand over the IAB node from the source IAB donor to the target IAB donor.

In some embodiments, X2/Xn interface signaling between a CU of the source IAB donor and a CU of the target IAB donor may bear the handover request message. The handover request message may include the foregoing first information. For specific content indicated by the first information and an implementation form, refer to the descriptions of the related embodiment of S901. Details are not described herein again.

Because the first information may indicate the duplex capability of the IAB node, that is, whether it is supported that the MT of the IAB node receives and sends data and the DU receives and sends data simultaneously. In this way, the target IAB donor configures the transmission direction of the time domain resource for the MT based on the first information, so that a conflict between a configuration for the MT and a configuration of the DU of the IAB node can be avoided as far as possible.

In some other embodiments, the handover request message may further include the second information, that is, configuration information configured by the source IAB donor for the DU of the IAB node, for example, the transmission direction of the time domain resource configured by the source IAB node for the DU and/or the status of the transmission direction of the time domain resource configured by the source IAB node for the DU. For specific content indicated by the first information and an implementation form, refer to the descriptions of the related embodiment of S903. Details are not described herein again.

Because the second information may indicate the configuration information configured by the source IAB donor for the DU of the IAB node, the target IAB donor may reconfigure the DU based on the second information, to avoid a conflict between a configuration configured by the target IAB donor for the MT based on the first information and a configuration of the DU of the IAB node by the source IAB node.

S1203: The target IAB donor sends a handover request response message to the source IAB donor, and the source IAB donor receives the handover request response message.

It should be understood that, if an X2/Xn interface exists between the CU of the target IAB donor and the CU of the source IAB donor, the X2/Xn interface signaling between the CU of the target IAB donor and the CU of the source IAB donor may bear the handover request response message.

In some embodiments, the handover request response message may include configuration information configured by the target IAB donor for the MT of the IAB node, for example, the foregoing first configuration information. For specific content indicated by the first configuration information and an implementation form, refer to the descriptions of the related embodiment of S1102. Details are not described herein again. Because the first configuration information is configured based on the first information, a conflict between the configuration for the MT and the configuration of the DU of the IAB node may be avoided as far as possible.

In some other embodiments, the handover request response message may include the first configuration information and configuration information configured by the target IAB donor for the DU of the IAB node, for example, the foregoing second configuration information. For specific content indicated by the second configuration information and an implementation form, refer to the descriptions of the related embodiment of S1104. Details are not described herein again. The second configuration information may be configured with reference to the second information. If the second information indicates that a configuration configured by the source IAB donor for the DU does not conflict with a configuration configured by the target IAB donor for the MT, the second configuration information may continue to use the configuration configured by the source IAB donor for the DU. If the second information indicates that the configuration configured by the source IAB donor for the DU conflicts with the configuration configured by the target IAB donor for the MT, the second configuration information may reconfigure the DU, so that the configuration of the DU does not conflict with the configuration of the MT. In addition, the second configuration information may be used to update the configuration of the DU. In this way, when it is ensured that the configuration of the MT of the IAB node does not conflict with the configuration of the DU, better performance of the DU may be further ensured as much as possible.

S1204: The source IAB donor sends an RRC reconfiguration message to the IAB node, and correspondingly, the IAB node receives the RRC reconfiguration message.

It should be understood that, after receiving the handover request response message, the source IAB donor may obtain the first configuration information configured by the target IAB donor for the MT of the IAB node, or obtain the first configuration information configured by the target IAB donor for the MT of the IAB node and the second configuration information configured by the target IAB donor for the DU of the IAB node, and notify the IAB node of the configuration performed by the target IAB donor for the IAB node.

As an example, after obtaining the first configuration information, the source IAB donor may generate an RRC reconfiguration message, where the RRC reconfiguration message may include the first configuration information. It should be understood that, if the source IAB donor obtains the first configuration information and the second configuration information, the RRC reconfiguration message may also include the first configuration information and the second configuration information. The RRC reconfiguration information may be encapsulated in the F1-AP message between a DU of the source parent node and a CU of the source IAB donor, and is borne through RRC signaling.

In some embodiments, the RRC reconfiguration message may further include configuration information for the IAB node to perform random access on the target parent node. For example, the RRC reconfiguration message may further include a physical random access channel (PRACH) resource configuration and the like.

It should be noted that, if the RRC reconfiguration message does not include the second configuration information, the second configuration information may be sent to the IAB node through another piece of signaling, for example, through an F1-AP message between a CU of the source IAB node and the IAB node. If the first configuration information and the second configuration information are separately sent to the IAB node through different messages, the IAB node should try to ensure that the first configuration information and the second configuration information take effect simultaneously, that is, the IAB node may try to simultaneously use the first configuration information and the second configuration information. That is, if the IAB node first receives the first configuration information, the IAB node may not immediately use the first configuration information until receiving the second configuration information, and may simultaneously use the first configuration information and the second configuration information. Alternatively, if the source IAB donor separately sends the first configuration information and the second configuration information through two pieces of signaling, it may be ensured as much as possible that the first configuration information and the second configuration information are sent at a same moment, to ensure as much as possible that the IAB node simultaneously receives the first configuration information and the second configuration information.

S1205: A random access process is performed between the IAB node and a DU of the target parent node.

A random access process in the conventional technology may be used for the random access process between the IAB node and the DU of the target parent node. Details are not described herein again.

S1206: The IAB node sends an RRC reconfiguration complete message to the target IAB donor via the target parent node.

The RRC reconfiguration complete message may indicate the IAB node to randomly access the target parent node and update the configuration of the MT, or update the configuration of the MT and the configuration of the DU, to complete an RRC link with the target IAB donor. In a possible implementation, the RRC reconfiguration complete message may be encapsulated in an F1-AP message between the DU of the target parent node and the target IAB donor.

S1207: The IAB node establishes an FI interface with the target IAB donor, and completes a configuration of route and bearer mapping.

After completing the RRC link with the target IAB donor, the IAB node may establish the F1 interface with the target IAB donor, and complete the configuration of route and bearer mapping, to perform data transmission between the IAB node and the target IAB donor based on the configuration.

It should be noted that FIG. 12 uses an example in which the IAB node does not have a lower-level node (child node). If a lower-level node of the IAB node or a lower-level node of the lower-level node exists, the target IAB donor may further configure a DU of the lower-level node of the IAB node and a DU of the lower-level node of the lower-level node, to update a configuration of the DU of the lower-level node of the IAB node and a configuration of the DU of the lower-level node of the lower-level node.

It should be understood that, in the embodiment shown in FIG. 12, an X2/Xn interface exists between the CU of the source IAB donor and the CU of the target IAB donor. If no X2/Xn interface exists between the CU of the source IAB donor and the CU of the target IAB donor, that is, the CU of the source IAB donor and the CU of the target IAB donor do not have a capability of directly exchanging interface signaling, a to-be-sent message is to be forwarded through the core network device. The following describes the IAB node configuration method provided in embodiments of this application by using an example in which no X2/Xn interface exists between the CU of the source IAB donor and the CU of the target IAB donor.

Figures 13, 14:
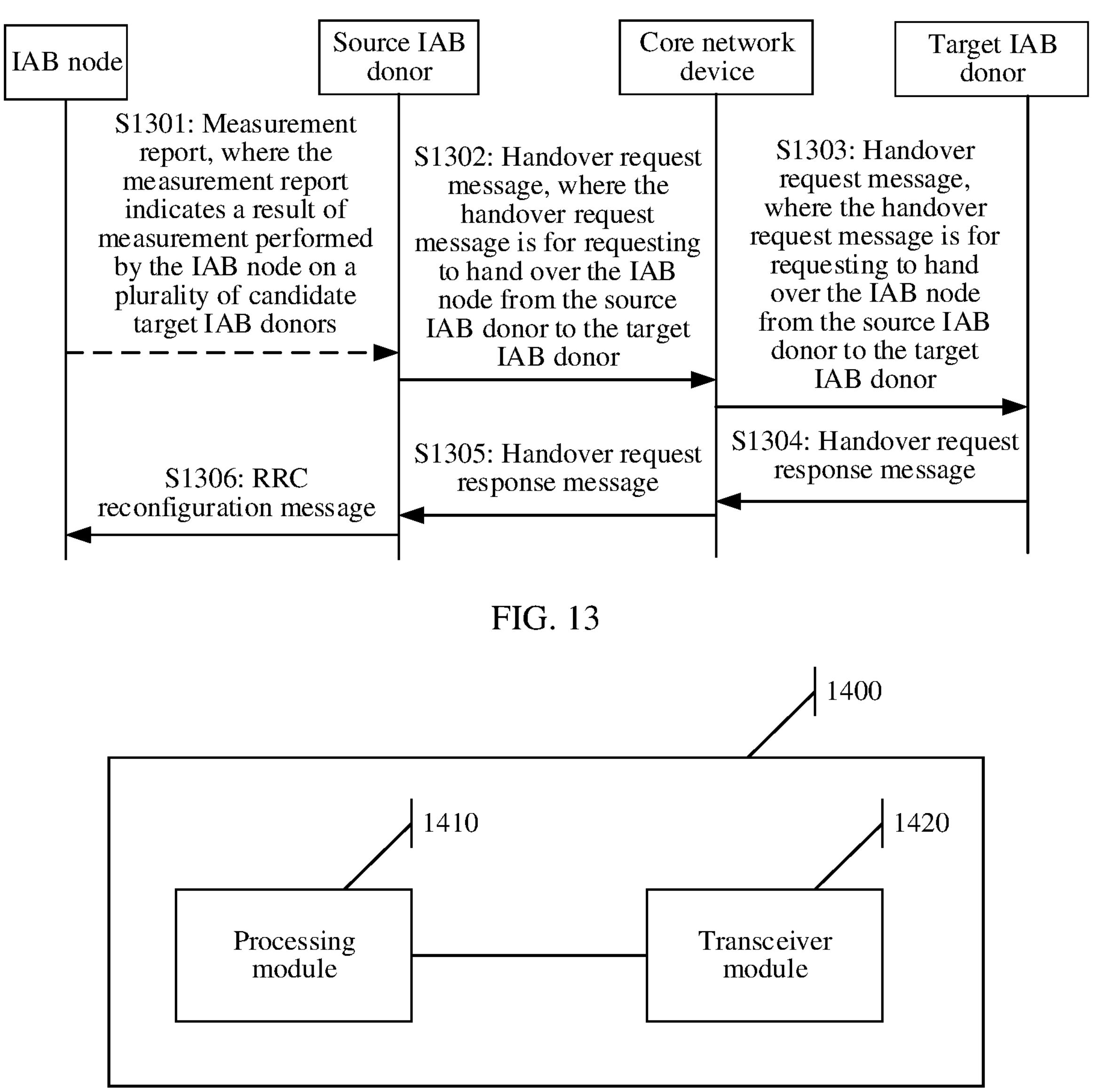
FIG. 13 is a schematic flowchart of another example of an IAB node configuration method according to an embodiment of this application.
FIG. 14 is a schematic diagram of a structure of a communication apparatus according to an embodiment of this application.

Example 2: Refer to FIG. 13, which is a schematic flowchart of an example of the IAB node configuration method provided in embodiments of this application. In the following description, an example in which the method is applied to the communication system shown in FIG. 9 and FIG. 10 is used. In addition, an example in which the method is performed by an IAB node, a source IAB donor, and a target IAB donor is used. It should be noted that the communication system in FIG. 9 and FIG. 10 is used as merely an example in this embodiment of this application, which is not limited to this scenario. The process is described as follows:

S1301: An IAB node sends a measurement report to a source IAB donor, and the source IAB donor receives the measurement report, where the measurement report indicates a result of measurement performed by the IAB node on a plurality of candidate target IAB donors.

It should be understood that implementation of S1301 is the same as that of S1201. For details, refer to the descriptions of S1201. Details are not described herein again.

S1302: The source IAB donor sends a handover request message to a core network device, and correspondingly, the core network device receives the handover request message.

S1303: The core network device sends the handover request message to a target IAB donor, and correspondingly, the target IAB donor receives the handover request message.

Because no X2/Xn interface exists between the CU of the source IAB donor and the CU of the target IAB donor, the source IAB donor may forward the foregoing handover request message to the target IAB donor through the core network device. For implementation of the handover request message, refer to related content in the embodiment shown in FIG. 12. Details are not described herein again.

S1304: The target IAB donor sends a handover request response message to the core network device, and correspondingly, the core network device receives the handover request response message.

S1305: The core network device sends the handover request response message to the source IAB donor, and correspondingly, the source IAB donor receives the handover request response message.

Similarly, because no X2/Xn interface exists between the CU of the source IAB donor and the CU of the target IAB donor, the target IAB donor may forward the foregoing handover request response message to the source IAB donor through the core network device. For implementation of the handover request response message, refer to related content in the embodiment shown in FIG. 12. Details are not described herein again.

S1306: The source IAB donor sends an RRC reconfiguration message to the IAB node.

It should be understood that implementation of S1306 is the same as that of S1204. For details, refer to the descriptions of S1204. Details are not described herein again.

In the method provided in embodiments of this application, in the cross-donor handover process of the IAB node, the target IAB donor configures the transmission direction of the time domain resource for the MT function with a duplex capability of the MT function and the DU function of the IAB node as a premise. In this way, a conflict between the transmission direction of the time domain resource of the MT function of the IAB node and the transmission direction of the time domain resource of the DU function can be avoided, so that a communication exception of the terminal can be avoided as much as possible. In addition, in the method, the target IAB donor may further update the configuration of the DU of the IAB node, that is, the target IAB donor configures both the MT of the IAB node and the DU of the IAB node, which ensures better performance of the DU as much as possible in a case of avoiding a conflict between the configuration of the MT and the configuration of the DU.

In the foregoing embodiments provided in this application, the method provided in embodiments of this application is described from aspects of a to-be-migrated IAB node, a source IAB donor, a target IAB donor, and interaction between the to-be-migrated IAB node, a source donor base station, and a target donor base station. To implement functions in the method provided in the foregoing embodiments of this application, the to-be-migrated IAB node, the source IAB donor, the target IAB donor may include hardware structures and/or software modules, and implement the foregoing functions in a form of a hardware structure, software module, or both hardware structure and software module.

The following describes communication apparatuses for implementing the foregoing method in embodiments of this application with reference to the accompanying drawings. Therefore, all the foregoing content may be used in subsequent embodiments. Repeated content is not described again.

FIG. 14 shows a schematic diagram of a structure of a communication apparatus 1400. The communication apparatus 1400 may correspondingly implement functions or steps implemented by the source IAB donor or the target IAB donor in the foregoing method embodiments. The communication apparatus may include a processing module 1410 and a transceiver module 1420. Optionally, the communication apparatus may further include a storage unit. The storage unit may be configured to store instructions (code or a program) and/or data. The processing module 1410 and the transceiver module 1420 may be coupled to the storage unit. For example, the processing module 1410 may fetch the instructions (code or a program) and/or data in the storage unit to implement a corresponding method. The foregoing units may be disposed independently, or may be partially or completely integrated. For example, the transceiver module 1420 may include a sending module and a receiving module.

In some possible implementations, the communication apparatus 1400 can implement behaviors and functions of the target IAB donor in the foregoing method embodiments correspondingly. For example, the communication apparatus 1400 may be the target IAB donor, or may be a component (for example, a chip or a circuit) used in the target IAB donor. The transceiver module 1420 may be configured to perform all receiving or sending operations performed by the target IAB donor in the embodiment shown in FIG. 9, FIG. 10, or FIG. 13, for example, S901 to S904 in the embodiment shown in FIG. 9, and/or configured to support another process of the technology described in this specification, where the processing module 1410 is configured to perform all operations except a transceiver operation performed by the target IAB donor in the embodiment shown in FIG. 9. For example, the transceiver module 1420 may be configured to perform S1002, S1003, S1006, and S1007 in the embodiment shown in FIG. 10, and/or configured to support another process of the technology described in this specification, where the processing module 1410 is configured to perform all operations except a transceiver operation performed by the target IAB donor in the embodiment shown in FIG. 10. For example, the transceiver module 1420 may be configured to perform S1303 and S1304 in the embodiment shown in FIG. 13, and/or configured to support another process of the technology described in this specification, where the processing module 1410 is configured to perform all operations except a transceiver operation performed by the target IAB donor in the embodiment shown in FIG. 11.

In some embodiments, the transceiver module 1420 is configured to receive first information from a source IAB donor, and send first configuration information to the source IAB donor. The processing module 1410 is configured to generate the first configuration information, where the first configuration information is for handing over an IAB node from the source IAB donor to the communication apparatus 1400. The IAB node includes an MT function and a DU function, the first configuration information is determined based on the first information, the first configuration information indicates a transmission direction of a time domain resource configured by the communication apparatus 1400 for the MT function, and the first information indicates one or more of the following four types of information:

- supporting or not supporting that the MT function receives data and the DU function sends data simultaneously;

supporting or not supporting that the MT function receives data and the DU function receives data simultaneously;

supporting or not supporting that the MT function sends data and the DU function sends data simultaneously; and supporting or not supporting that the MT function sends data and the DU function receives data simultaneously.

As an optional implementation, the transceiver module 1420 is further configured to receive second information from the source IAB donor, where the second information indicates a transmission direction of a time domain resource configured by the source IAB donor for the DU function, and/or the second information indicates a status of the transmission direction of the time domain resource configured by the source IAB donor for the DU function.

As an optional implementation, the transceiver module 1420 is further configured to send second configuration information to the source IAB donor, where the second configuration information is determined based on the first information, and the second configuration information indicates a transmission direction of a time domain resource configured by the communication apparatus 1400 for the DU function, and/or the second configuration information indicates a status of the transmission direction of the time domain resource configured by the communication apparatus 1400 for the DU function.

As an optional implementation, the first information and/or the second information is carried in a first request message, first interface signaling bears the first request message, a first interface is an interface between the communication apparatus 1400 and the source IAB donor, and the first request message is for requesting to hand over the IAB node from the source IAB donor to the communication apparatus 1400; or the first information and/or the second information is received by the communication apparatus 1400 through a core network device.

As an optional implementation, the first configuration information and/or the second configuration information is carried in a first request response message, the first interface signaling bears the first request response message, the first interface is the interface between the communication apparatus 1400 and the source IAB donor, and the first request response message is a response message sent by the communication apparatus 1400 to the source IAB donor in response to a request message for handing over the IAB node from the source IAB donor to the communication apparatus 1400; or the first configuration information and/or the second configuration information is forwarded by the communication apparatus 1400 to the source IAB node through the core network device.

As an optional implementation, the transmission direction of the time domain resource is an uplink transmission direction, a downlink transmission direction, or a flexible transmission direction; and the status of the transmission direction of the time domain resource is an available state, a conditionally available state, or a not available state.

In some other possible implementations, the communication apparatus 1400 can implement behaviors and functions of the source IAB donor in the foregoing method embodiments correspondingly. For example, the communication apparatus 1400 may be the source IAB donor, or may be a component (for example, a chip or a circuit) used in the source IAB donor. The transceiver module 1420 may be configured to perform all receiving or sending operations performed by the source IAB donor in the embodiment shown in FIG. 9, FIG. 10, or FIG. 13, for example, S901 to S904 in the embodiment shown in FIG. 9, and/or configured to support another process of the technology described in this specification, where the processing module 1410 is configured to perform all operations except a transceiver operation performed by the source IAB donor in the embodiment shown in FIG. 9. For example, the transceiver module 1420 may be configured to perform S1001 to S1004 in the embodiment shown in FIG. 10, and/or configured to support another process of the technology described in this specification, where the processing module 1410 is configured to perform all operations except a transceiver operation performed by the source IAB donor in the embodiment shown in FIG. 10. For example, the transceiver module 1420 may be configured to perform S1301, S1302, S1305, and S1306 in the embodiment shown in FIG. 13, and/or configured to support another process of the technology described in this specification, where the processing module 1410 is configured to perform all operations except a transceiver operation performed by the source IAB donor in the embodiment shown in FIG. 11.

In some embodiments, the processing module 1410 is configured to generate first information. The transceiver module 1420 is configured to send the first information to a target IAB donor, and receive first configuration information from the target IAB donor, where the first configuration information is for handing over an IAB node from the communication apparatus 1400 to the target IAB donor. The IAB node includes an MT function and a DU function, the first configuration information is determined based on first information, the first configuration information indicates a transmission direction of a time domain resource configured by the target IAB donor for the MT function, and the first information indicates one or more of four types of information:

supporting or not supporting that the MT function receives data and the DU function sends data simultaneously;

supporting or not supporting that the MT function receives data and the DU function receives data simultaneously;

supporting or not supporting that the MT function sends data and the DU function sends data simultaneously; and supporting or not supporting that the MT function sends data and the DU function receives data simultaneously.

As an optional implementation, the transceiver module 1420 is further configured to send second information to the target IAB donor, where the second information indicates a transmission direction of a time domain resource configured by the communication apparatus 1400 for the DU function, and/or the second information indicates a status of the transmission direction of the time domain resource configured by the communication apparatus for the DU function.

As an optional implementation, the transceiver module 1420 is further configured to receive second configuration information from the target IAB donor, where the second configuration information is determined based on the first information, the second configuration information indicates a transmission direction of a time domain resource configured by the target IAB donor for the DU function, and/or the second configuration information indicates a status of the transmission direction of the time domain resource configured by the target IAB donor for the DU function.

As an optional implementation, the first information and/or the second information is carried in a first request message, first interface signaling bears the first request message, a first interface is an interface between the target IAB donor and the communication apparatus 1400, and the first request message is for requesting to hand over the IAB node from the communication apparatus 1400 to the target IAB donor; or the first information and/or the second information is sent by the communication apparatus 1400 through a core network device.

As an optional implementation, the first configuration information and/or the second configuration information is carried in a first request response message, the first interface signaling bears the first request response message, the first interface is the interface between the target IAB donor and the communication apparatus, and the first request response message is a response message sent by the target IAB donor to the communication apparatus 1400 in response to a request message for handing over the IAB node from the communication apparatus 1400 to the target IAB donor; or the first configuration information and/or the second configuration information is received by the communication apparatus 1400 through the core network device.

In a possible implementation, the transmission direction of the time domain resource is an uplink transmission direction, a downlink transmission direction, or a flexible transmission direction; and the status of the transmission direction of the time domain resource is an available state, a conditionally available state, or a not available state.

Figure 15:
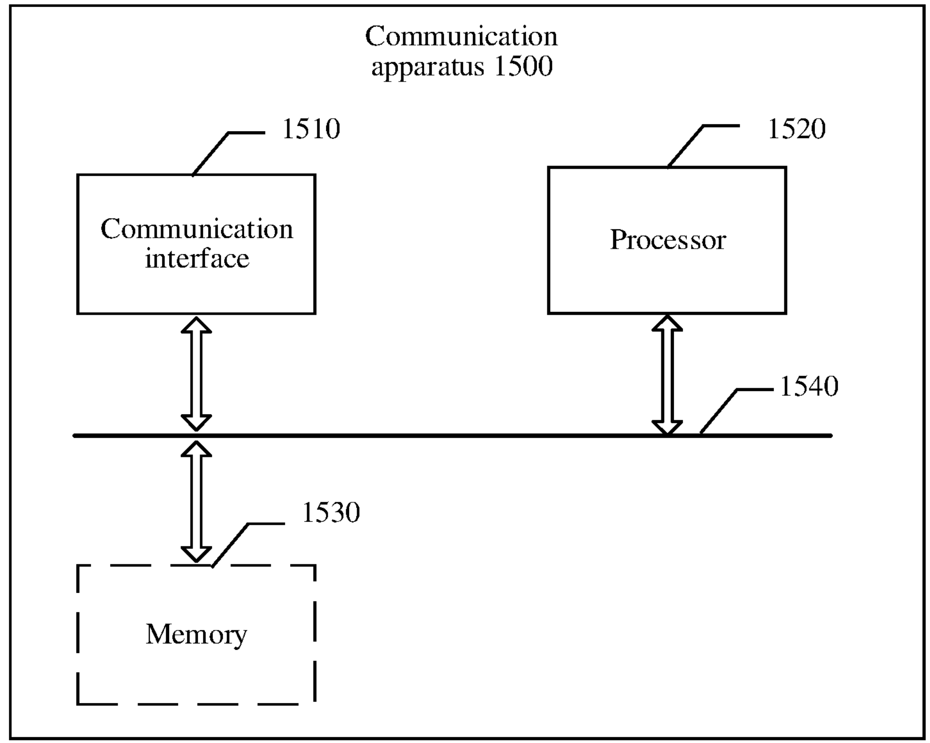
FIG. 15 is a schematic diagram of a structure of another communication apparatus according to an embodiment of this application.

FIG. 15 shows a communication apparatus 1500 according to an embodiment of this application. The communication apparatus 1500 may be a source IAB donor, which can implement functions of the source IAB donor in the method provided in embodiments of this application, or the communication apparatus 1500 may be a target IAB donor, which can implement functions of the target IAB donor in the method provided in embodiments of this application. Alternatively, the communication apparatus 1500 may be an apparatus that can support the source IAB donor in implementing a corresponding function in the method provided in embodiments of this application, or an apparatus that can support the target IAB donor in implementing a corresponding function in the method provided in embodiments of this application. The communication apparatus 1500 may be a chip system. In this embodiment of this application, the chip system may include a chip, or may include the chip and another discrete component.

In hardware implementation, the foregoing transceiver module 1420 may be a transceiver integrated in the communication apparatus 1500 to form a communication interface 1510.

The communication apparatus 1500 includes at least one processor 1520, configured to implement or support the communication apparatus 1500 in implementing functions of the source IAB donor or the target IAB donor in the method provided in embodiments of this application. For details, refer to detailed descriptions in the method example. Details are not described herein again.

The communication apparatus 1500 may further include at least one memory 1530, configured to store program instructions and/or data. The memory 1530 is coupled to the processor 1520. The coupling in this embodiment of this application is indirect coupling or a communication connection between apparatuses, units, or modules for information exchange between the apparatuses, the units, or the modules, and may be in electrical, mechanical, or other forms. The processor 1520 may cooperate with the memory 1530. The processor 1520 may execute program instructions and/or data stored in the memory 1530, to enable the communication apparatus 1500 to implement a corresponding method. At least one of the at least one memory may be included in the processor.

The communication apparatus 1500 may further include a communication interface 1510, configured to communicate with another device through a transmission medium, so that an apparatus used in the communication apparatus 1500 may communicate with the another device. For example, when the communication apparatus is a source IAB donor, the another device is a target IAB donor; or when the communication apparatus is a target IAB donor, the another device is a source IAB donor. The processor 1520 may send and receive data through the communication interface 1510. The communication interface 1510 may be a transceiver.

A specific connection medium between the communication interface 1510, the processor 1520, and the memory 1530 is not limited in this embodiment of this application. In this embodiment of this application, in FIG. 15, the memory 1530, the processor 1520, and the communication interface 1510 are connected through a bus 1540. The bus is represented by a thick line in FIG. 15. A connection manner between other components is merely described as an example, and is not limited thereto. The bus may be classified into an address bus, a data bus, a control bus, and the like. For ease of representation, only one thick line is used to represent the bus in FIG. 15, but this does not mean that there is only one bus or only one type of bus.

In this embodiment of this application, the processor 1520 may be a general purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general purpose processor may be a microprocessor, or may be any conventional processor or the like. The steps of the method disclosed with reference to embodiments of this application may be directly performed and completed by a hardware processor, or may be performed and completed by a combination of hardware and software modules in the processor.

In this embodiment of this application, the memory 1530 may be a nonvolatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Figure 16:
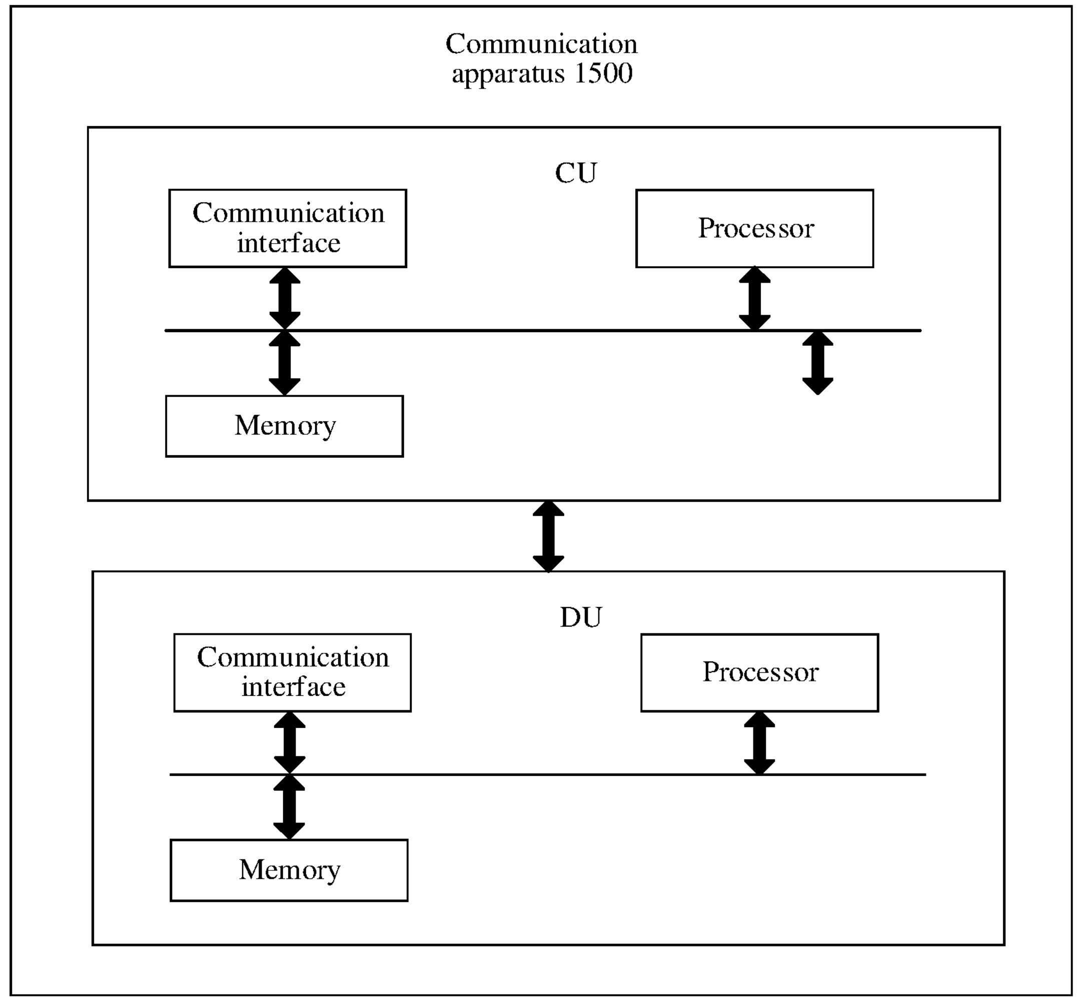
FIG. 16 is a schematic diagram of a structure of an exemplary communication apparatus according to an embodiment of this application.

It should be understood that when the communication apparatus 1500 is a source IAB donor or a target IAB donor, FIG. 16 shows another form of the communication apparatus 1300. In FIG. 16, the communication apparatus 1500 is a source IAB donor or a target IAB donor. It should be understood that the source IAB donor or the target IAB donor includes a CU and a DU. The CU may include a communication interface, a processor, a memory, and a bus that connects the communication interface, the processor, and the memory. The communication interface may be configured to communicate with a CU of another IAB donor or a DU of an IAB node. The DU may also include a communication interface, a processor, a memory, and a bus that connects the communication interface, the processor, and the memory. The communication interface is configured to communicate with an MT of the IAB node.

Figure 17:
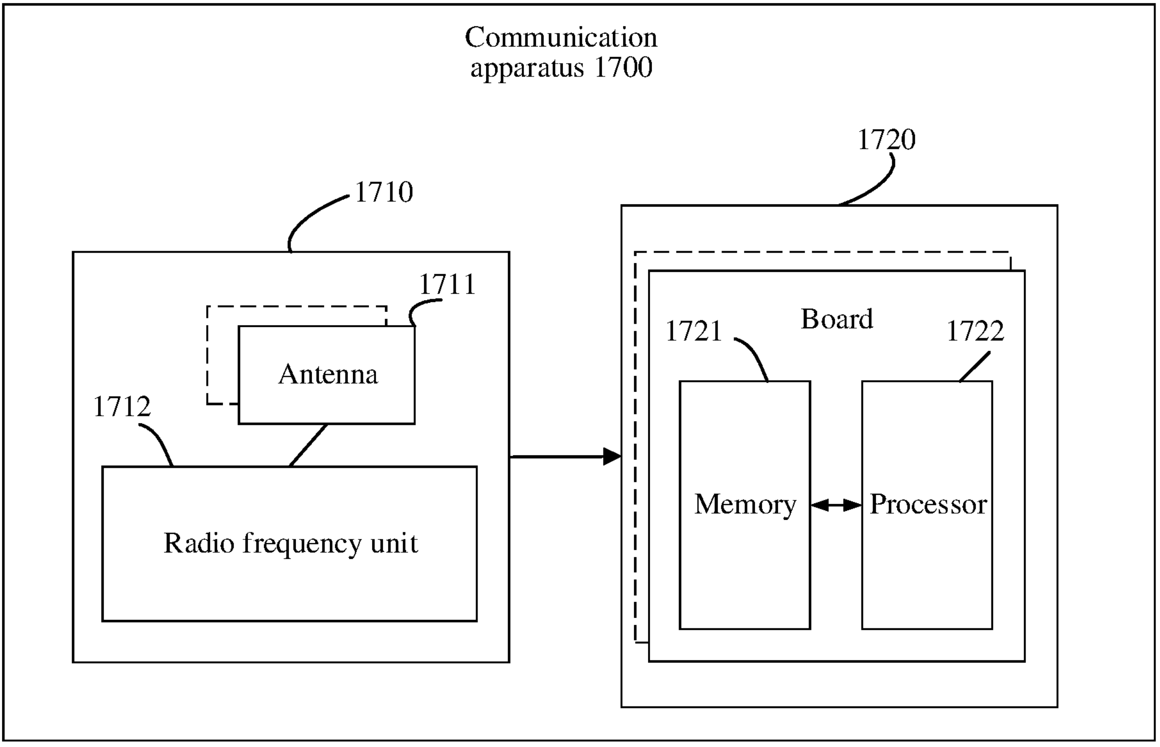
FIG. 17 is a schematic diagram of a structure of another exemplary communication apparatus according to an embodiment of this application.

FIG. 17 shows a communication apparatus in another form. For ease of understanding and illustration, in FIG. 17, an example in which the communication apparatus is a source IAB donor or a target IAB donor is used. A communication apparatus 1700 may be used in the system shown in FIG. 7 or FIG. 8, may be the donor nodes in FIG. 7 and FIG. 8, and performs functions of the source IAB donor or the target IAB donor in the foregoing method embodiments. The communication apparatus 1700 may include one or more radio frequency units, for example, a remote radio unit (RRU) 1710, and one or more baseband units (BBU) (or may be referred to as a digital unit) 1720. The RRU 1710 may be referred to as a communication module, and correspond to the transceiver module 1420 in FIG. 14. Optionally, the communication module may also be referred to as a transceiver machine, a transceiver circuit, a transceiver, or the like, and may include at least one antenna 1711 and a radio frequency unit 1712. The RRU 1710 is mainly configured to receive and send a radio frequency signal and perform conversion between the radio frequency signal and a baseband signal. For example, the communication apparatus 1700 is a source IAB donor and is configured to send the foregoing first information to a target IAB donor. The BBU 1720 is mainly configured to perform baseband processing, control a base station, and the like. The RRU 1710 and the BBU 1720 may be physically disposed together, or may be physically separated, namely, a distributed base station.

The BBU 1720 is a control center of the base station, and may also be referred to as a processing module. The BBU 1720 may correspond to the processing module 1410 in FIG. 14, and is mainly configured to implement a baseband processing function such as channel coding, multiplexing, modulation, or spreading. For example, the BBU (the processing module) may be configured to control the base station to perform the operation procedure related to the network device in the foregoing method embodiments, for example, generate the foregoing indication information.

In an example, the BBU 1720 may include one or more boards, and a plurality of boards may jointly support a radio access network (such as an LTE network) having a single access standard, or may separately support radio access networks (for example, an LTE network, a 5G network, or another network) having different access standards. The BBU 1720 further includes a memory 1721 and a processor 1722. The memory 1721 is configured to store necessary instructions and data. The processor 1722 is configured to control the base station to perform a necessary action, for example, configured to control the base station to perform the operation procedure related to the source IAB donor or the target IAB donor in the foregoing method embodiments. The memory 1721 and the processor 1722 may serve one or more boards. In other words, a memory and a processor may be deployed independently on each board. Alternatively, a plurality of boards may share a same memory and a same processor. In addition, a necessary circuit may be further disposed on each board.

An embodiment of this application further provides a communication system. The communication system includes an IAB node, a source IAB donor, and a target IAB donor, or may further include more IAB nodes, a source IAB donor, and a target IAB donor.

The source IAB donor and the target IAB donor each are configured to implement functions of the related devices in FIG. 9, FIG. 10, or FIG. 13. For details, refer to the related descriptions in the method embodiment. Details are not described herein again.

An embodiment of this application further provides a computer-readable storage medium, including instructions. When the instructions are run on a computer, the computer is enabled to perform the method performed by the source IAB donor and the target IAB donor in FIG. 9, FIG. 10, or FIG. 13.

An embodiment of this application further provides a computer program product, including instructions. When the instructions are run on a computer, the computer is enabled to perform the method performed by the source IAB donor and the target IAB donor in FIG. 9, FIG. 10, or FIG. 13.

An embodiment of this application provides a chip system. The chip system includes a processor and may further include a memory, and is configured to implement functions of the source IAB donor and the target IAB donor in the foregoing method. The chip system may include a chip, or include a chip and another discrete device.

It should be understood that sequence numbers of the foregoing processes do not mean execution sequences in various embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely exemplary. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed on a plurality of network units. Some or all of the units may be selected based on an actual requirement to achieve the objectives of the solutions in embodiments.

In addition, functional units in embodiments of this application may be integrated into one processing unit, or each of the units may exist alone physically, or two or more units are integrated into one unit.

When the function is implemented in the form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of embodiments of this application. Any variation or replacement readily figured out by a person skilled in the art within the technical scope disclosed in embodiments of this application shall all fall within the protection scope of embodiments of this application. Therefore, the protection scope of embodiments of this application shall be subject to the protection scope of the claims.

What is claimed is:

1. An integrated access and backhaul (IAB) node configuration method, comprising:

receiving, by a target IAB donor, first information from a source IAB donor;

sending, by the target IAB donor, first configuration information to the source IAB donor; and sending, by the target IAB donor, second configuration information to the source IAB donor, wherein the first configuration information is for handing over an IAB node from the source IAB donor to the target IAB donor, the IAB node comprises a mobile terminal (MT) function and a distributed unit (DU) function, the first configuration information is based on the first information, the first configuration information indicates a transmission direction of a time domain resource configured by the target IAB donor for the MT function, the second configuration information is based on the first information, the second configuration information indicates one or more of a transmission direction of a time domain resource configured by the target IAB donor for the DU function or a status of the transmission direction of the time domain resource configured by the target IAB donor for the DU function, and the first information indicates one or more of:

information supporting or not supporting that the MT function receives data and the DU function sends data simultaneously;

information supporting or not supporting that the MT function receives data and the DU function receives data simultaneously;

information supporting or not supporting that the MT function sends data and the DU function sends data simultaneously; or information supporting or not supporting that the MT function sends data and the DU function receives data simultaneously.

2. The IAB node configuration method according to claim 1, further comprising:

receiving, by the target IAB donor, second information from the source IAB donor, wherein the second information indicates one or more of a transmission direction of a time domain resource configured by the source IAB donor for the DU function or a status of the transmission direction of the time domain resource configured by the source IAB donor for the DU function.

3. The IAB node configuration method according to claim 2, wherein the transmission direction of the time domain resource is an uplink transmission direction, a downlink transmission direction, or a flexible transmission direction, and the status of the transmission direction of the time domain resource is an available state, a conditionally available state, or a not available state.

4. An integrated access and backhaul (IAB) node configuration method, comprising:

sending, by a source IAB donor, first information to a target IAB donor;

receiving, by the source IAB donor, first configuration information from the target IAB donor; and receiving, by the source IAB donor, second configuration information from the target IAB donor, wherein the first configuration information is for handing over an IAB node from the source IAB donor to the target IAB donor, the IAB node comprises a mobile terminal (MT) function and a distributed unit (DU) function, the first configuration information is based on the first information, the first configuration information indicates a transmission direction of a time domain resource configured by the target IAB donor for the MT function, the second configuration information is based on the first information, the second configuration information indicates one or more of a transmission direction of a time domain resource configured by the target IAB donor for the DU function or a status of the transmission direction of the time domain resource configured by the target IAB donor for the DU function, and the first information indicates one or more of:

information supporting or not supporting that the MT function receives data and the DU function sends data simultaneously;

information supporting or not supporting that the MT function receives data and the DU function receives data simultaneously;

information supporting or not supporting that the MT function sends data and the DU function sends data simultaneously; or information supporting or not supporting that the MT function sends data and the DU function receives data simultaneously.

5. The IAB node configuration method according to claim 4, further comprising:

sending, by the source IAB donor, second information to the target IAB donor, wherein the second information indicates one or more of a transmission direction of a time domain resource configured by the source IAB donor for the DU function or a status of the transmission direction of the time domain resource configured by the source IAB donor for the DU function.

6. The IAB node configuration method according to claim 5, wherein
- the transmission direction of the time domain resource is an uplink transmission direction, a downlink transmission direction, or a flexible transmission direction, and
- the status of the transmission direction of the time domain resource is an available state, a conditionally available state, or a not available state.

7. An apparatus in an integrated access and backhaul (IAB) system, comprising:
- at least one processor; and
- at least one memory storing instructions that, when executed by the at least one processor, cause the apparatus to:
- receive as a target IAB donor, first information from a source IAB donor;
- send as the target IAB donor, first configuration information to the source IAB donor; and
- send as the target IAB donor, second configuration information to the source IAB donor, wherein
- the first configuration information is for handing over an IAB node from the source IAB donor to the target IAB donor,
- the IAB node comprises a mobile terminal (MT) function and a distributed unit (DU) function,
- the first configuration information is based on the first information,
- the first configuration information indicates a transmission direction of a time domain resource configured by the target IAB donor for the MT function,
- the second configuration information is based on the first information,
- the second configuration information indicates one or more of a transmission direction of a time domain resource configured by the target IAB donor for the DU function or a status of the transmission direction of the time domain resource configured by the target IAB donor for the DU function, and
- the first information indicates one or more of:
  - information supporting or not supporting that the MT function receives data and the DU function sends data simultaneously;
  - information supporting or not supporting that the MT function receives data and the DU function receives data simultaneously;
  - information supporting or not supporting that the MT function sends data and the DU function sends data simultaneously; or
  - information supporting or not supporting that the MT function sends data and the DU function receives data simultaneously.

8. The apparatus according to claim 7, wherein the apparatus is further caused to:
- receive as the target IAB donor, second information from the source IAB donor,
- wherein the second information indicates one or more of a transmission direction of a time domain resource configured by the source IAB donor for the DU function or a status of the transmission direction of the time domain resource configured by the source IAB donor for the DU function.

9. The apparatus according to claim 8, wherein
- the transmission direction of the time domain resource is an uplink transmission direction, a downlink transmission direction, or a flexible transmission direction, and
- the status of the transmission direction of the time domain resource is an available state, a conditionally available state, or a not available state.

10. An apparatus in an integrated access and backhaul (IAB) system, comprising:
- at least one processor; and
- at least one memory storing instructions that, when executed by the at least one processor, cause the apparatus to:
- send as a source IAB donor, first information to a target IAB donor;
- receive as the source IAB donor, first configuration information from the target IAB donor; and
- receive as the source IAB donor, second configuration information from the target IAB donor, wherein
- the first configuration information is for handing over an IAB node from the source IAB donor to the target IAB donor,
- the IAB node comprises a mobile terminal (MT) function and a distributed unit (DU) function,
- the first configuration information is based on the first information,
- the first configuration information indicates a transmission direction of a time domain resource configured by the target IAB donor for the MT function,
- the second configuration information is based on the first information,
- the second configuration information indicates one or more of a transmission direction of a time domain resource configured by the target IAB donor for the DU function or a status of the transmission direction of the time domain resource configured by the target IAB donor for the DU function, and
- the first information indicates one or more of:
  - information supporting or not supporting that the MT function receives data and the DU function sends data simultaneously;
  - information supporting or not supporting that the MT function receives data and the DU function receives data simultaneously;
  - information supporting or not supporting that the MT function sends data and the DU function sends data simultaneously; or
  - information supporting or not supporting that the MT function sends data and the DU function receives data simultaneously.

11. The apparatus according to claim 10, wherein the apparatus is further caused to:
- send as the source IAB donor, second information to the target IAB donor,
- wherein the second information indicates one or more of a transmission direction of a time domain resource configured by the source IAB donor for the DU function or a status of the transmission direction of the time domain resource configured by the source IAB donor for the DU function.

12. The apparatus according to claim 11, wherein
- the transmission direction of the time domain resource is an uplink transmission direction, a downlink transmission direction, or a flexible transmission direction, and
- the status of the transmission direction of the time domain resource is an available state, a conditionally available state, or a not available state.

13. A integrated access and backhaul (IAB) system, comprising:

a target IAB donor; and a source IAB donor, wherein the target IAB donor is configured to:

receive first information from the source IAB donor;

send first configuration information to the source IAB donor; and send second configuration information to the source IAB donor, the source IAB donor is configured to:

send the first information to the target IAB donor;

receive the first configuration information from the target IAB donor; and receive the second configuration information from the target IAB donor, the first configuration information is for handing over an IAB node from the source IAB donor to the target IAB donor, the IAB node comprises a mobile terminal (MT) function and a distributed unit (DU) function, the first configuration information is based on the first information, the first configuration information indicates a transmission direction of a time domain resource configured by the target IAB donor for the MT function, the second configuration information is based on the first information, the second configuration information indicates one or more of a transmission direction of a time domain resource configured by the target IAB donor for the DU function or a status of the transmission direction of the time domain resource configured by the target IAB donor for the DU function, and the first information indicates one or more of:

information supporting or not supporting that the MT function receives data and the DU function sends data simultaneously;

information supporting or not supporting that the MT function receives data and the DU function receives data simultaneously;

information supporting or not supporting that the MT function sends data and the DU function sends data simultaneously; or information supporting or not supporting that the MT function sends data and the DU function receives data simultaneously.

14. The system according to claim 13, wherein the target IAB donor is further configured to receive second information from the source IAB donor, the second information indicates one or more of a transmission direction of a time domain resource configured by the source IAB donor for the DU function or a status of the transmission direction of the time domain resource configured by the source IAB donor for the DU function, and the source IAB donor is further configured to send the second information to the target IAB donor.

15. The system according to claim 14, wherein the transmission direction of the time domain resource is an uplink transmission direction, a downlink transmission direction, or a flexible transmission direction, and the status of the transmission direction of the time domain resource is an available state, a conditionally available state, or a not available state.

* * * * *